(12) United States Patent
Nakashima et al.

(10) Patent No.: US 9,166,790 B2
(45) Date of Patent: Oct. 20, 2015

(54) COMMISSION INFORMATION GENERATOR FOR MAKING PROCESSES ON COMMUNICATION PERFORMED BY ANOTHER COMPUTER

(71) Applicant: Oki Electric Industry Co., Ltd., Tokyo (JP)

(72) Inventors: Jun Nakashima, Tokyo (JP); Kiyoshi Fukui, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 260 days.

(21) Appl. No.: 13/742,839

(22) Filed: Jan. 16, 2013

(65) Prior Publication Data

US 2013/0195274 A1    Aug. 1, 2013

(30) Foreign Application Priority Data

Jan. 27, 2012    (JP) .................................. 2012-015216

(51) Int. Cl.
*H04L 9/30* (2006.01)
*H04L 9/08* (2006.01)
*H04L 9/32* (2006.01)

(52) U.S. Cl.
CPC ................ *H04L 9/30* (2013.01); *H04L 9/0841* (2013.01); *H04L 9/3006* (2013.01); *H04L 9/3066* (2013.01); *H04L 9/3247* (2013.01); *H04L 2209/76* (2013.01)

(58) Field of Classification Search
None
See application file for complete search history.

(56) References Cited

U.S. PATENT DOCUMENTS

| | | | | |
|---|---|---|---|---|
| 5,764,772 A * | 6/1998 | Kaufman et al. | ............... | 380/30 |
| 5,768,389 A * | 6/1998 | Ishii | ............... | 380/30 |
| 6,118,874 A * | 9/2000 | Okamoto et al. | ............... | 380/282 |
| 6,396,928 B1 * | 5/2002 | Zheng | ............... | 380/285 |
| 6,957,330 B1 * | 10/2005 | Hughes | ............... | 713/163 |
| 7,197,643 B2 | 3/2007 | Takase | | |
| 8,555,400 B2 * | 10/2013 | Shi et al. | ............... | 726/26 |
| 2005/0190912 A1 * | 9/2005 | Hopkins et al. | ............... | 380/44 |
| 2008/0147563 A1 * | 6/2008 | Yen et al. | ............... | 705/65 |
| 2013/0287206 A1 * | 10/2013 | Hattori et al. | ............... | 380/30 |

* cited by examiner

*Primary Examiner* — Michael R Vaughan
(74) *Attorney, Agent, or Firm* — Rabin & Berdo, P.C.

(57) ABSTRACT

In a communicator in a communication system, a commission information generator for generating a commission parameter to make a process on a communication between communicators performed by another computer includes a first memory for storing a secret key and an encrypter for generating N number of the commission parameters, where N is a natural number, from a first to an N-th commission parameter. The encrypter regards a j-th shared key, where j is a positive integer equal to or less than N, out of the N number of shared keys as key information, encrypts a bit sequence representation of j-th partial information, associated with the j-th shared key, out of N pieces of partial information, and thereby generates a j-th commissioned parameter.

3 Claims, 18 Drawing Sheets

56

COMMISSION INFORMATION GENERATOR FOR MAKING PROCESSES ON COMMUNICATION PERFORMED BY ANOTHER COMPUTER

BACKGROUND OF THE INVENTION

1. Field of the Invention

The present invention relates to a commission information generator, a shared key calculator, a signature synthesizer, a commissioned key sharing computer and a commissioned signature generation computer, which can be applied, for example, to cases where a commissioned computer can securely process some of computations related to key exchange and authentication processes in proxy of communicators performing a communication.

2. Description of the Background Art

In order to use sensors and similar devices in social infrastructure sectors requiring high reliability and quality such as disaster prevention, traffic control, and financial applications, it is necessary to maintain the security of communications between communicators, for example, a server providing services and sensors connected thereto.

In order for a communicator such as a sensor to secure a secured end-to-end communication path with another communicator such as a service providing server, exchange of information (for authentication and exchange of keys) on an end-to-end basis is needed between the two communicators incorporated in the server and sensor.

A case in which communicators such as sensors form a power-saving multi-hop network will be discussed below. In this network, communicators such as sensors deliver data like from hand to hand. If a communicator does not participate in the data delivery, it sleeps, thus saving power consumption.

For example, where a huge number of communicators such as sensors are deployed over a broad area and a secured end-to-end communication path should be secured between each communicator and a server on the Internet, the aforementioned information exchange on the end-to-end basis raises the possibility that some problems such as congestion of power-saving multi-hop networks and increases in power consumption and processing time would take place.

A conventional solution to cope with the above-described problems is set forth in U.S. Pat. No. 7,197,643 to Takase. In this method, key exchange operations are assigned to a host network to alleviate the terminal load. This is because it is difficult to introduce an end-to-end key exchange operation required for Security Architecture for Internet Protocol (IPsec) to a cellular phone or a personal digital assistant (PDA) that needs small size and light weight.

In Takase, however, in order that the host network equipment acts as a proxy in execution of the key exchange operation, it is necessary that confidential information on an authentication key for the terminal device be given to the proxy equipment. Furthermore, in Takase, a shared key needs to be calculated by the proxy equipment.

For example, where proxy equipment in a network on a cloud environment is assumed or where plural proxy devices are employed, it is not very desirable to cause confidential information not associated with the proxy equipment to be treated by the proxy equipment because of the reliability of maintenance of confidential information given to the proxy equipment.

SUMMARY OF THE INVENTION

It is therefore an object of the present invention to provide a commission information generator, a shared key calculator, a signature synthesizer, a commissioned key sharing computer and a commissioned signature generation computer, which are capable of improving the reliability of maintenance of confidential information given to proxy equipment.

In accordance with the present invention, a commission information generator for generating a commission parameter to make a process on a communication between communicators performed by another computer includes a first memory for storing a secret key and an encrypter for generating N number of the commission parameters, where N is a natural number, from a first to an N-th commission parameter. The encrypter regards a j-th shared key, where j is a positive integer equal to or less than N, out of the N number of shared keys as key information, encrypts a bit sequence representation of j-th partial information, associated with the j-th shared key, out of N pieces of partial information, and thereby generates a j-th commissioned parameter.

Also in accordance with the present invention, a shared key calculator for generating a shared key for use in a communication between communicators includes a memory for storing shared keys from a first shared key to an N-th shared key, where N is a natural number, respectively sharing with proxy computers from a first proxy computer to an N-th proxy computer performing a process on the communication; a partial shared key decrypter for, when N number of elements in a given cyclic group encrypted with the respective shared keys are input, decrypting the input elements by using the respective shared keys to derive N pieces of partial information; and a shared key synthesizer for deriving given secret information by synthesizing the N pieces of partial information, decrypted by the partial shared key decrypter, according to a given computational operation.

Also in accordance with the present invention, a signature synthesizer for generating a signature for use in a communication between communicators includes a memory for storing shared keys sharing with proxy computers performing a process on the communication as well as a secret key; a partial signature parameter decrypter for decrypting N pieces of partial digital signature information, where N is a natural number, encrypted with the partial shared keys by using the partial shared keys stored in the memory; a signature parameter synthesizer for deriving digital signature computational information by synthesizing the decrypted N pieces of partial digital signature information; and a signature generator for generating digital signature on the basis of the digital signature computational information.

Also in accordance with the present invention, a commissioned key sharing computer for calculating a partial shared key for use in a communication between communicators on behalf of one of the communicators includes a first memory for storing commissioned parameter; a decrypter for decrypting arbitrary bit sequence information as a ciphertext with a given key information bit sequence used, the descrypter decrypting the commissioned parameter as the bit sequence information with information on a shared key used as the key information bit sequence; a first calculator for receiving the decrypted commissioned parameter information from the decrypter and performing a given calculation on the basis of the decrypted commissioned parameter information and given numeral information; and an encrypter for encrypting the arbitrary bit sequence information with a given key information bit sequence used, the encrypter encrypting the calculation result supplied from the first calculator as the arbitrary bit sequence information.

Also in accordance with the present invention, a commissioned signature generation computer for generating a signature for use in a communication between communicators on behalf of one of the communicators includes a random number generator for generating a random number; a first calculator for coupling a number of the generators in a given cyclic group as many as indicated by a given integer by using a mathematical operator defined in the cyclic group, the first calculator performing given computational operations with the random number received from the random number generator as the given integer; and an encrypter for encrypting the random number received from the random number generator with a bit sequence of a shared key.

According to the present invention, it is possible to perform key exchange and/or authentication processes associated with communications between communicators by means of proxy equipment in proxy of the communicators while maintaining the reliability of maintenance of confidential information given to the proxy equipment.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

The fundamental concept of the present invention will be described below. In the present invention, when communications are performed between plural communicators, some of computations associated with security control between the communicators are performed by a commissioned computer in proxy of the communicators themselves.

The commissioned computer executes some of computations related to key sharing, PKI (public key infrastructure) decryption and digital signature calculations which satisfy the following five conditions (1)-(5). A computation method for the key sharing can be the Diffie-Hellman key sharing method (more specifically, elliptic curve Diffie-Hellman key sharing).

(1) The commissioned computer can perform commissioned calculations without treating confidential information at all other than secret key information corresponding to a public key for the commissioned computer itself, the public key being registered in the PKI.

(2) The commissioned computer cannot know the shared key.

(3) The key sharing protocol is compliant with the Diffie-Hellman (elliptic curve Diffie-Hellman) key sharing protocol or with a premaster secret delivery key sharing protocol, and is an authentication protocol coping with an authentication achieved by a validation using digital signature technology.

(4) In computations related to authentication and key sharing, the amount of computation performed by a communicator commissioning computations is less than that of computation needed for calculation of powers (exponentiation) on a finite field or that of calculation corresponding to scalar multiplications at rational points on an elliptic curve.

(5) The load on a communication network including this communicator is such that the traffic between the communicator and the commissioned computer is within one reciprocating stream of traffic per authentication or key sharing operation.

In the following, an embodiment of a communication system including the commission information generator, the shared key calculator, the signature synthesizer, the commissioned key sharing computer and the commissioned signature generation computer of the present invention will be described in detail with reference to some drawings.

In this embodiment, the Diffie-Hellman key sharing protocol is adopted as a key sharing protocol between communicators. Moreover, the validation using digital signature technology is employed as an authentication method.

Figure 1:
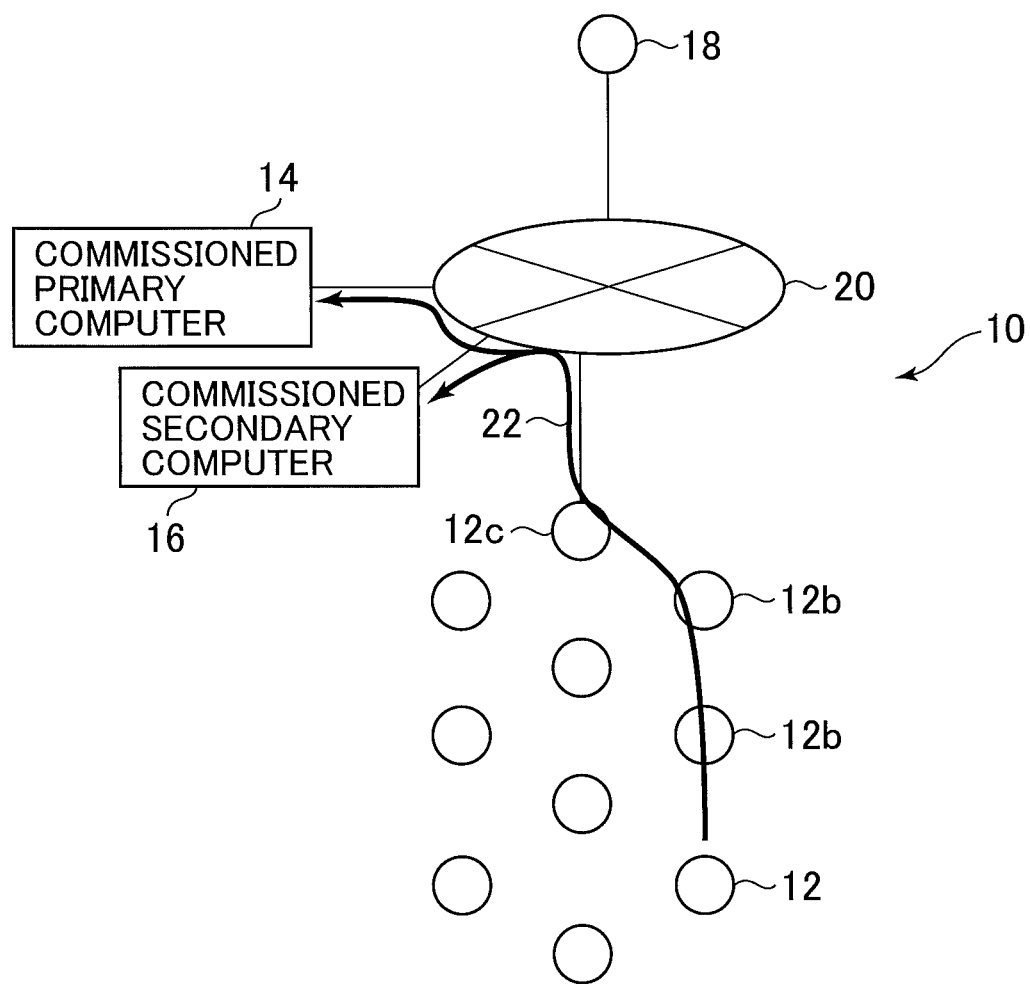
FIG. 1 is a schematic diagram showing the whole configuration of a system according to an embodiment of the present invention.

FIG. 1 is a schematic diagram showing the whole configuration of a communication system 10 according to the embodiment of the invention. The system 10 includes at least a communicator 12, a commissioned primary computer 14, a commissioned secondary computer 16 and another communicator 18.

The communicator 12 is installed, for example, in a sensor, a smart terminal or another terminal, which is restricted in available network band and power consumption.

The communicator 12 performs data communications by multi-hop transmission. In the embodiment shown in FIG. 1, in a case where the communicator 12 performs data transmissions towards the communicator 18, the communicator 12 performs the transmissions by multi-hop technology on some communicators 12b and a terminator 12c connected to a network 20. The terminator 12c can be similar to the communicator 12 in terms of the structure and function. When security tasks are performed between the communicators 12 and 18, the communicator 12 also performs communications with the commissioned primary computer 14 and commissioned secondary computer 16 on the terminators 12b and 12c.

As shown in FIG. 1, the communicator 12 transmits commissioned parameter information 22 for making commissioned computers 16 and 18 act over the calculations required for the communication between the communicators 12 and 18 to the commissioned computers.

The communicator 18 is a communication device installed in a service providing server or the like present in the network 20.

The commissioned primary computer 14 and commissioned secondary computer 16 together constitute a commissioned computer in accordance with the present invention. In an authenticated key sharing protocol, the commissioned computers perform some of computations to be performed by the communicator 12 on behalf of this communicator 12.

In FIG. 1, the commissioned primary computer 14 is shown to be physically different from the commissioned secondary computer 16. However, if various functions of the commissioned computers 14 and 16 can be executed in single equipment, the two commissioned computers 14 and 16, described later, can be physically incorporated in the same equipment.

In the system 10 shown in FIG. 1, there is only one commissioned secondary computer 16. However, there may be a plurality of commissioned secondary computers 16.

In the description of the embodiment, g indicates a generator of a cyclic group $<G, \cdot>$ and is a parameter commonly used within the system 10. Moreover, n is an order in the cyclic group G.

An integer x is a secret key for the communicator 12. $P\_X = g^x$ indicates a public key for the communicator 12.

An integer v is a secret key for the communicator 18. $P\_V = g^v$ indicates a public key for the communicator 18.

An integer $d\_1$ is a secret key for the commissioned primary computer 14. $P\_D1 = g^{d\_1}$ indicates a public key for this commissioned computer 14.

An integer $d\_2$ is a secret key for the commissioned secondary computer 16. $P\_D2 = g^{d\_2}$ indicates a public key for this commissioned computer 16.

$\alpha \cdot \beta \in G$ in the cyclic group G means that computational operations defined by the cyclic group G can be applied to operands $\alpha$ and $\beta$. Furthermore, $\alpha^\beta \in G$ means that a computational operation defined by the cyclic group G is performed $\beta$ times on the operand $\alpha$. $\alpha/\beta \in G$ means that a computational operation defined by the cyclic group G is performed on the operand $\alpha$ and the inverse element to the $\beta$ defined by the cyclic group.

For example, if the cyclic group G is a group formed by rational points on an elliptic curve E, $\alpha \cdot \beta \in G$ means an elliptic curve addition of $\alpha$ and $\beta$ on the elliptic curve E. $\alpha^\beta \in G$ means an elliptic curve scalar $\beta$ multiplication of $\alpha$. $\alpha/\beta \in G$ means an elliptic curve subtraction of $\beta$ from $\alpha$.

For example, where the cyclic group G is a multiplicative group of finite fields, $\alpha \cdot \beta \in G$ means a multiplication of $\alpha$ and $\beta$. $\alpha^\beta \in G$ means the $\beta$th power of $\alpha$. $\alpha/\beta \in G$ means a division of $\alpha$ by $\beta$. $X\_Y$ is the same for the case where Y is subscripted with respect to X in meaning.

It is assumed that a shared key $K\_XD1$ of a shared key encryption algorithm is previously shared between the communicator 12 and the commissioned primary computer 14 and that another shared key $K\_XD2$ is previously shared between the communicator 12 and the commissioned secondary computer 16.

Figure 2:
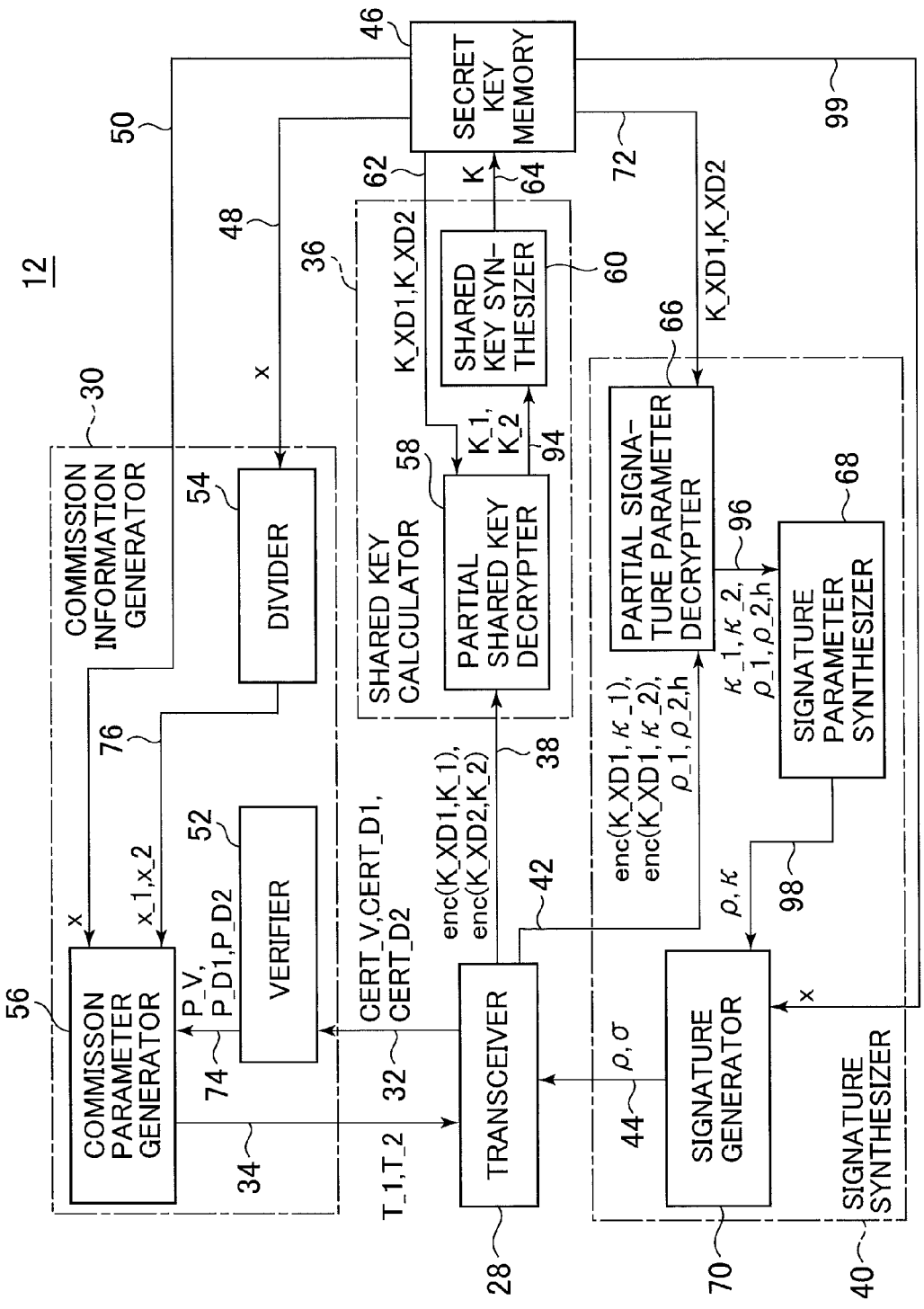
FIG. 2 is a schematic block diagram showing the internal configuration of a source communicator according to the embodiment shown in FIG. 1.

Next, an internal configuration of the communicator will be described below. FIG. 2 shows the internal configuration of the communicator 12, which has a transceiver 28 for transmitting and receiving information to/from another apparatus such as the primary computer 14, the secondary computer 16 and the communicator 18 which communicates with the communicator 12.

The communicator 12 includes a commission information generator 30, which is connected with the receiver 28 via an input line 32 and an output line 34, for generating parameter information required for making computers 14 and 16 perform key exchange and/or authentication processes for the communicator 12.

The communicator 12 further includes a shared key calculator 36, which is connected with the transceiver 28 via a communication line 38, for finding out a shared key K, a signature synthesizer 40, which is connected with the transceiver 28 via an input line 42 and an output line 44, for forming a digital signature and a secret key memory 46 for secretly storing a secret key x.

The commission information generator 30 is connected to the secret key memory 46 via communication lines 48 and 50. In the boardmeaning, the secret key memory 46 can be also included in the commission information generator 30.

The commission information generator 30 includes a verifier 52 for verifying the signature on a supplied public key certificate, a divider 54 for dividing a supplied secret key into pieces of secret key information and a commission parameter generator 56 for generating parameters for transmitting the commissioned computers 14 and 16 on the basis of the secret key x, the verified public keys and the divided secret keys.

The shared key calculator 36 includes a partial shared key decrypter 58 for decrypting encoded information supplied from the transceiver 28 and a shared key synthesizer 60 for synthesizing several pieces of decrypted information.

The shared key calculator 36 is connected via communication lines 62 and 64 to the secret key memory 46. In the board meaning, the secret key memory 46 can be also included in the shared key calculator 36.

The signature synthesizer 40 includes a partial signature parameter decrypter 66 for decrypting encoded information supplied from the transceiver 28 on the line 42, a signature parameter synthesizer 68 for calculating parameters on signature information received from the decrypter 66 and a signature generator 70 for generating the signature on the basis of parameters calculated by the synthesizer 68.

The signature synthesizer 40 is connected to the secret key memory 46 via a communication line 72 for delivering information stored in the memory 46 to the synthesizer 40. In the board meaning, the secret key memory 46 can be also included in the signature synthesizer 40.

The transceiver 28 communicates with at least the commissioned primary computer 14 and the commissioned secondary computer 16, by means of a given communication protocol.

The transceiver 28 receives encrypted partial shared key information $enc(K\_XD1, K\_1)$, encrypted partial digital signature computational parameter information $enc(K\_XD1, \kappa\_1)$, partial digital signature parameter information $\rho\_1$ and a message digest h from the commissioned primary computer 14.

The transceiver 28 further receives encrypted partial shared key information $enc(K\_XD2, K\_2)$, encrypted partial digital signature computational parameter information enc (K_XD2, κ_2) and partial digital signature parameter information ρ_2 from the commissioned secondary computer 16.

The transceiver 28 transmits commissioned parameter information T_1 for the commissioned primary computer 14 to the computer 14, commissioned parameter information T_2 for the commissioned secondary computer 16 to the computer 16 and digital signature information ρ and σ to the communicator 18.

The secret key memory 46 securely stores at least the secret key x of a public key pair consisting of the secret key x and the public key P_X=g^x. The secret key memory 46 can supply the secret key x on the lines 48 and 50 to the commission information generator 30.

The secret key memory 46 further stores cryptographic key information K_XD1, shared with the commissioned primary computer 14, and K_XD2, shared with the commissioned secondary computer 16. The memory 46 can deliver the cryptographic key information K_XD1 and K_XD2 on the line 62 to the partial shared key decrypter 58. Furthermore, the memory 46 is connected via the line 72 to the partial signature parameter decrypter 66 to deliver the information K_XD1 and K_XD2.

The secret key memory 46 is connected to the shared key synthesizer 60 via the line 64. The secret key memory 46 may store shared key K, which is calculated by and supplied from the shared key synthesizer 60.

The verifier 52 can acquire an arbitrary public key certificate to verify a signature on the obtained public key certificate. The public key certificate includes the public key, information for identification of the certificate holder and a digital signature signed for certifying the information with a secret key of the certificate authority of the public key infrastructure. The public key certificate may further include information on a validity period, an issuer, signature algorithm and so on.

ITU-T (International Telecommunication Union Telecommunication Standardization Sector) Recommendation X.509 is generally used for the public key certificate. Of course, the ITU-T Recommendation X.509 can be applied to the public key certificate used in the present invention.

The public key of the certificate authority, not shown, of the PKI is previously stored in the verifier 52, which can verify the digital signature information by the use of a given verification algorithm and the stored public key. For this reason, the verifier is considered as a kind of memory for the public keys.

No restriction is imposed on the method of acquiring the public key certificate. For example, the public key certificate may be supplied from the certificate authority of the PKI via the transceiver 28 to the verifier 52. Alternatively, the certificate may be obtained from an input interface such as an external memory device.

In this embodiment, the verifier 52 acquires the public key certificate, which is received by the transceiver 28, on the line 32. The public key certificates of the commissioned primary computer 14, the commissioned secondary computer 16 and the communicator 18 are indicated by CERT_D1, CERT_D2 and CERT_V, respectively.

The verifier 52 is connected via a communication line 74 with the commission parameter generator 56 and delivers the verified certificates CERT_D1, CERT_D2 and CERT_V as acquired public information CERT_D1, CERT_D2 and CERT_V, respectively to the generator 56.

The divider 54 has the input 48 for receiving the secret key x from the secret key memory 46 and divides the secret key x into N parts as indicated by Expression 1. The divider 54 also has an output 76 connecting with the commissioned parameter generator 56 to deliver the divided secret keys to the generator 56. In this embodiment, N=2 is taken. That is, the divider 54 divides the secret key x into two pieces of secret key information, given by x_1 and x_2.

$$x = x\_1 + x\_2 + \ldots + x\_N \quad (1),$$

where N is an integer equal to or more than two.

The commissioned parameter generator 56 receives the secret key x from the secret key memory 46 and the divided secret key information x_1 and x_2 from the divider 54. The generator 56 further receives from the verifier 52 the public key P_V for the communicator 18, the public key P_D1 for the primary computer 14 and P_D2 for the secondary computer 16.

On the basis of the received information, the generator 56 generates the commissioned parameter information T_1 for the commissioned primary computer 14 according to following Expression 2.

$$T\_1 = enc(K\_XD1, P\_V\textasciicircum x\_1), \text{ where}$$

$$K\_XD1 = F(P\_D1\textasciicircum x) \quad (2)$$

Note that enc (K, M) is a function for encrypting a bit sequence M as key information on a bit sequence K and that F (X) is a function for converting the generator X of G into a bit sequence on key information. For instance, a conceivable method of obtaining a bit sequence of a given key length is to feed a bit sequence representation of X into an SHA-256 (Secure Hash Algorithm: Federal Information Processing Standards Publication 180-2) Hash function.

The key bit sequence information K_XD1 may be previously stored in the secret key memory 46 instead of calculated in the generator 56. In this instance, the information K_XD1 previously stored in the memory 46 can be delivered to the generator 56 with the secret key x.

The commissioned parameter generator 56 delivers the calculated commissioned parameter information T_1 to the transceiver 28 and thence to the commissioned primary computer 14.

The commissioned parameter generator 56 further generates the commissioned parameter information T_2 for the commissioned secondary computer 16 according to following Expression 3.

$$T\_2 = enc(K\_XD2, P\_V\textasciicircum x\_2), \text{ where}$$

$$K\_XD2 = F(P\_D2\textasciicircum x) \quad (3)$$

Furthermore, the generator 56 delivers the generated commissioned parameter information T_2 to the transceiver 28 and thence to the commissioned secondary computer 16.

The key bit sequence information K_XD2, which is used for the information T_2, may be previously stored in the secret key memory 46 instead of calculated by the generator 56.

Figure 3:
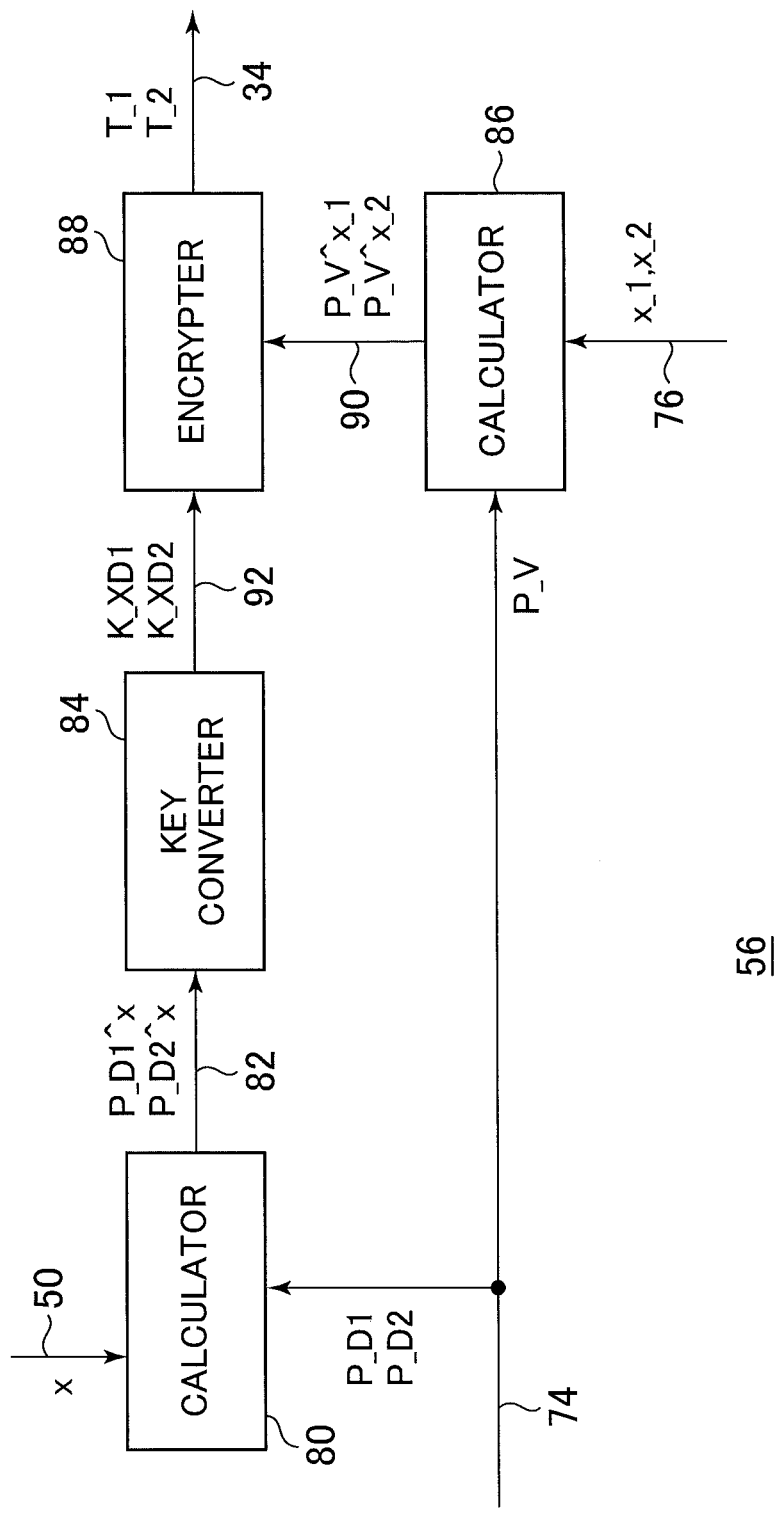
FIG. 3 is a schematic block diagram showing the internal configuration of the commission parameter generator shown in FIG. 2.

An constructive example of the commission parameter generator 56 will be described in detail with reference to FIG. 3, in which the generator 56 capable of deriving the key bit sequence information K_XD1 and K_XD2 is shown.

The commission parameter generator 56 includes a calculator 80 for performing a calculation on the basis of the secret key x and public keys P_D1 and P_D2 received on the lines 50 and 74, respectively. The generator 56 further includes a key converter 84, connected via a line 82 with the calculator 80, for converting the results calculated by the calculator 80 into public key information K_XD1 and K_XD2.

The commission parameter generator 56 further includes another calculator 86 having inputs 74 and 76. The calculator 86 performs a calculation on the basis of the public key P_V and the divided secret key information x_1 and x_2.

The generator includes an encrypter 88 for encrypting the results calculated by the calculator 86 received on a line 90. The encrypter 88 is further connected via a line 92 with the key converter 84 to receive the public key information K_XD1 and K_XD2 and use them for the encryption. The encrypted information is transmitted as the commissioned parameter information T_1 and T_2.

As shown in FIG. 2, the partial shared key decrypter 58 is connected via the line 38 with the transceiver 28 to receive the encrypted partial shared key information enc(K_XD1, K_1) generated by the commissioned primary computer 14. The information enc(K_XD1, K_1) is generated by encrypting partial shared key information K_1 with the shared key K_XD1, which is previously shared between the commissioned primary computer 14 and the communicator 12.

The partial shared key decrypter 58 further receives other partial shared key information enc(K_XD2, K_2) generated by the commissioned secondary computer 16. The information enc(K_XD2, K_2) is generated by encrypting partial shared key information K_2 with the shared key K_XD2, which is previously shared between the commissioned secondary computer 16 and the communicator 12.

The partial shared key decrypter 58 decrypts the received information enc(K_XD1, K_) and enc(K_XD2, K_2) into the partial shared key information K_1 and K_2, respectively.

The partial shared key decrypter 58 has an output 94 connected to an input of the shared key synthesizer 60 to deliver the decrypted information K_1 and K_2 to the synthesizer 60.

The above-described enc(K_XD2, K_2) may be delivered from the commissioned secondary computer 16 to the commissioned primary computer 14 and thence to the communicator 12.

The shared key synthesizer 60 receives the partial shared key information K_1 and K_2 from the partial shared key decrypter 58 to find the shared key information K, which is shared between the communicators 12 and 18, according to Expression 4.

$$K = F(K\_1 \cdot K\_2) \quad (4)$$

In the signature synthesizer 40, the partial signature parameter decrypter 66 has the input 42 connecting to the output of the transceiver 28 to receive the encrypted partial digital signature computational parameter information enc(K_XD1, κ_1) and enc(K_XD2, κ_2), the partial digital signature parameter information ρ_1 and ρ_2 and the message digest h.

The partial signature parameter decrypter 66 further has the input 72 connecting to the output of the secret key memory 46 to receive the shared keys K_XD1 and K_XD2. The decrypter decrypts the information enc(K_XD1, κ_1) and enc(K_XD2, κ_2) to κ_1 and κ_2 by using the received keys K_XD1 and K_XD2, respectively.

The decrypter 66 has an output 96 connecting to an input of the signature parameter synthesizer 68 to transmit the decrypted κ_1 and κ_2, partial digital signature parameter information ρ_1 and ρ_2 and the message digest h to the parameter synthesizer 68.

In the information supplied to the decrypter 66, the information enc(K_XD2, κ_2) may be delivered from the commissioned secondary computer 16 to the commissioned primary computer 14 and thence to the communicator 12.

The signature parameter synthesizer 68 receives the partial digital signature computational parameter information κ_1 and κ_2, partial digital parameter information ρ_1 and ρ_2 constituting subelements of the digital signature information ρ and message digest h from the signature parameter decrypter 66. The synthesizer 68 then calculates digital signature computational parameter information κ and digital signature parameter information ρ according to following Expression 5.

$$\rho = \rho\_1 \cdot \rho\_2$$

$$\kappa = \kappa\_1 + \kappa\_2 (\bmod n) \quad (5)$$

If κ and n are not prime to each other, the communicator 12 makes the commissioned computers 14 and 16 regenerate the partial digital signature computational parameters κ_1 and κ_2, respectively.

Especially, in a case where the signature algorithm is ECDSA (Elliptic Curve Digital Signature Algorithm), the above-described parameter information ρ is a rational point vector, whose first component is regarded as a bit sequence of unsigned integers. When the first component is divided by the order n, the remainder of the division is afresh set to the parameter information ρ.

If the parameter ρ is 0 or 1, then κ_1 and κ_2 are regenerated by the commissioned computers 14 and 16, respectively, until the inequality ≤ρ≤n−1 is achieved. Under the circumstance, the parameter ρ is recalculated.

The signature parameter synthesizer 68 is connected via a communication line 98 to the signature generator 70 to supply the calculated parameter information κ and ρ to the generator 70.

The signature generator 70 is connected to the secret key memory 46 via a communication line 99 to receive the secret key x from the memory 46. The signature generator 70 generates digital signature parameter information σ out of the digital signature information ρ and σ, according to following Expression 6 with the information κ and ρ fed from the signature parameter synthesizer 68.

$$\sigma = \epsilon^* (h + x\rho)(\bmod n),$$

$$\text{where } \exists s.t. \epsilon^* \kappa = 1 (\bmod n) \quad (6)$$

The digital signature information ρ and σ generated by the signature synthesizer 40 is transmitted on the line 44 to the transceiver 28.

Figure 4:
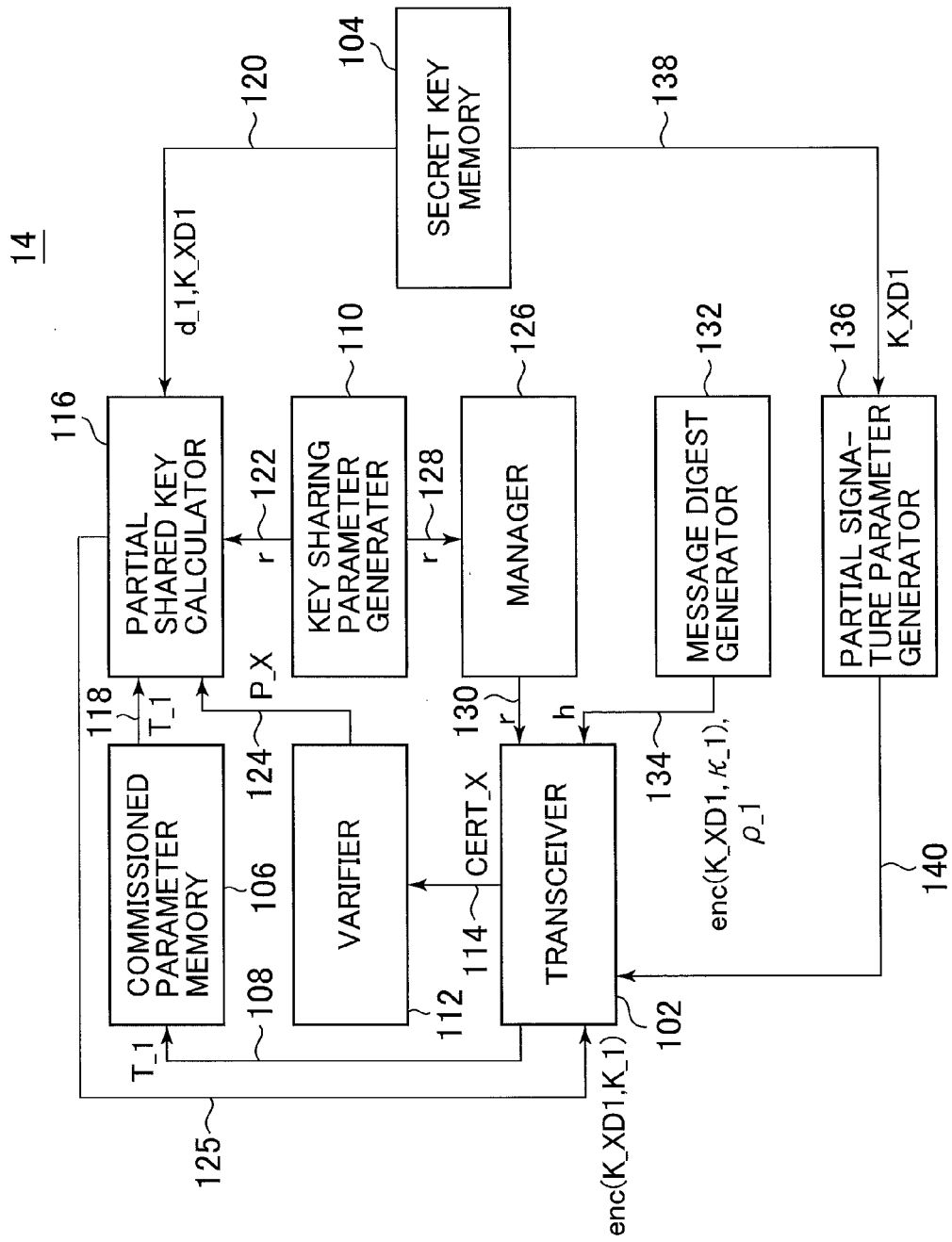
FIG. 4 is a schematic block diagram showing the internal configuration of a commissioned primary computer according to the embodiment.

Next, an internal configuration of the commissioned primary computer 14 in the embodiment will be described below with reference to FIG. 4. The commissioned primary computer 14 has a transceiver 102 for transmitting and receiving information according to a communication protocol so that the primary computer 14 can communicate with the communicator 12, the commissioned secondary computer 14 and the communicator 16.

The commissioned primary computer 14 further has a secret key memory 104 for securely storing at least the secret key d_1 in a public key pair consisting of the secret key d_1 and the public key P_D1=g^d_1. The memory 104 may store the key information K_XD1 preshared with the communicator 12.

The commissioned primary computer 14 has a commissioned parameter memory 106 which is connected via a communication line 108 to an output of the transceiver. The commissioned parameter memory 106 stores the commissioned parameter information T_1 supplied from the communicator 12.

In this embodiment, the transceiver 102 receives the parameter information T_1 from the communicator 12 on the communication path extending to the communicator 12. However, the information T_1 may be set fro an input interface such as Universal Serial Bus (USB) memory or another external memory device. The commissioned parameter memory 106 is not required to provide secured management to prevent leakage of the information T_1.

The commissioned primary computer 14 has a key sharing parameter generator 110 for generating a key sharing parameter r. For example, the generator 110 can generate pseudo-random numbers set as the key sharing parameter r.

In this embodiment, the key sharing parameter r generated by the commissioned primary computer 14 is supplied to the communicator 18, as described later. However, the commissioned primary computer 14 can receive the key sharing parameter r from the communicator 18 which can generate the parameter r. Besides, commissioned primary computer 14 and communicator 18 may generate respective random numbers and exchange them to each other. In this case, the key shared parameter r is generated by feeding both random numbers into a hash function and performing calculations.

The commissioned primary computer 14 has a verifier 112 connected via a communication line 114 to an output of the transceiver 102. The verifier 112 can obtain a public key certificate CERT_X for the communicator 12 on the transceiver 102 to verify the signature on the obtained certificate.

The commissioned primary computer 14 has a partial shared key calculator 116 connected via a communication line 118 with the commissioned parameter memory 106. The partial shared key calculator 116 receives the commissioned parameter information T_1 from the memory 106. The calculator 116 is also connected via a communication line 120 with the secret key memory 104 and receives the secret key d_1 and the shared key K_XD1 from the memory 104.

However, the shared key K_XD1 may be derived, for example, according to Expression 7 without being stored in the secret key memory 104.

$$K\_XD1 = F(P\_X^{d\_1}) \tag{7}$$

Furthermore, the partial shared key calculator 116 is connected via a communication line 122 with the key sharing parameter generator 204 and receives the shared key parameter r. The calculator 116 is also connected via a communication line 124 with the verifier 112 and receives the public key P_X for the communicator 12, the public key P_X being obtained when the verifier 112 verifies the signature on the public key certificate CERT_X for the communicator 12.

The partial shared key calculator 116 subsequently calculates the partial shared key information K_1 according to following Expression 8.

$$enc(K\_XD1, K\_1), \text{ where}$$

$$K\_1 = Z\_1^r$$

$$Z\_1 = dec(K\_XD1, T\_1) \tag{8}$$

The partial shared key calculator 116 performs encryption of the information K_1 with the key K_XD1 previously shared with the communicator 12 to deliver the encrypted partial shared key information enc(K_XD1, K_1) on a communication line 125 to the transceiver 102.

The commissioned primary computer 14 includes a key sharing parameter manager 126, which is connected with an output 128 of the key sharing parameter generator 110, for managing the delivery of the shared key parameter r supplied from the generator 110.

The key sharing parameter manager 110 has an output 130 connected with the transceiver 102 to transmit the shared key parameter r on the transceiver 102 to the computer 18, if needed.

The commissioned primary computer 14 includes a message digest generator 132 for generating a hash value (that is to say, message digest) h of a given message using a hash function. The message digest generator 132 has an output 134 connected with the transceiver 102 to deliver the generated message digest h on the transceiver 102 to the communicator 12.

The message can convey information used, for example, as an input in generating a TLS1.2 (Transport Layer Security 1.2) Certificate Verify message. Of course, applicable information as the message for the present invention is not restricted to the above information.

The commissioned primary computer 14 includes a partial signature parameter generator 136 connected via a communication line 138 to the secret key memory 104. The generator 136 receives the shared key K_XD1 from the secret key memory 104.

The partial signature parameter generator 136 generates the parameter κ_1 at random as a sort of partial digital signature computational parameter information and further the partial digital signature parameter information ρ_1 according to following Expression 9. The generator 136 further encrypts the partial digital signature computational parameter information κ_1 with the key K_XD1 previously shared with the communicator 12.

$$\rho\_1 = g^{\kappa\_1}$$

$$enc(K\_XD1, \kappa\_1) \tag{9}$$

The partial signature parameter generator 136 has an output 140 connected with the transceiver 102 to transmit ρ_1 and enc(K_XD1, κ_1) on the transceiver 102 to the communicator 12.

As stated above, the commissioned primary computer 16 in this embodiment can be also considered as the invention relating to a commissioned computer including a key sharing parameter generator for generating information on a random number, a message digest generator for generating a message digest on the basis of a given massage and a transceiver for transmitting the information on the random number to another commissioned computer and a communication server and the message digest to a terminal communicator.

Figure 5:
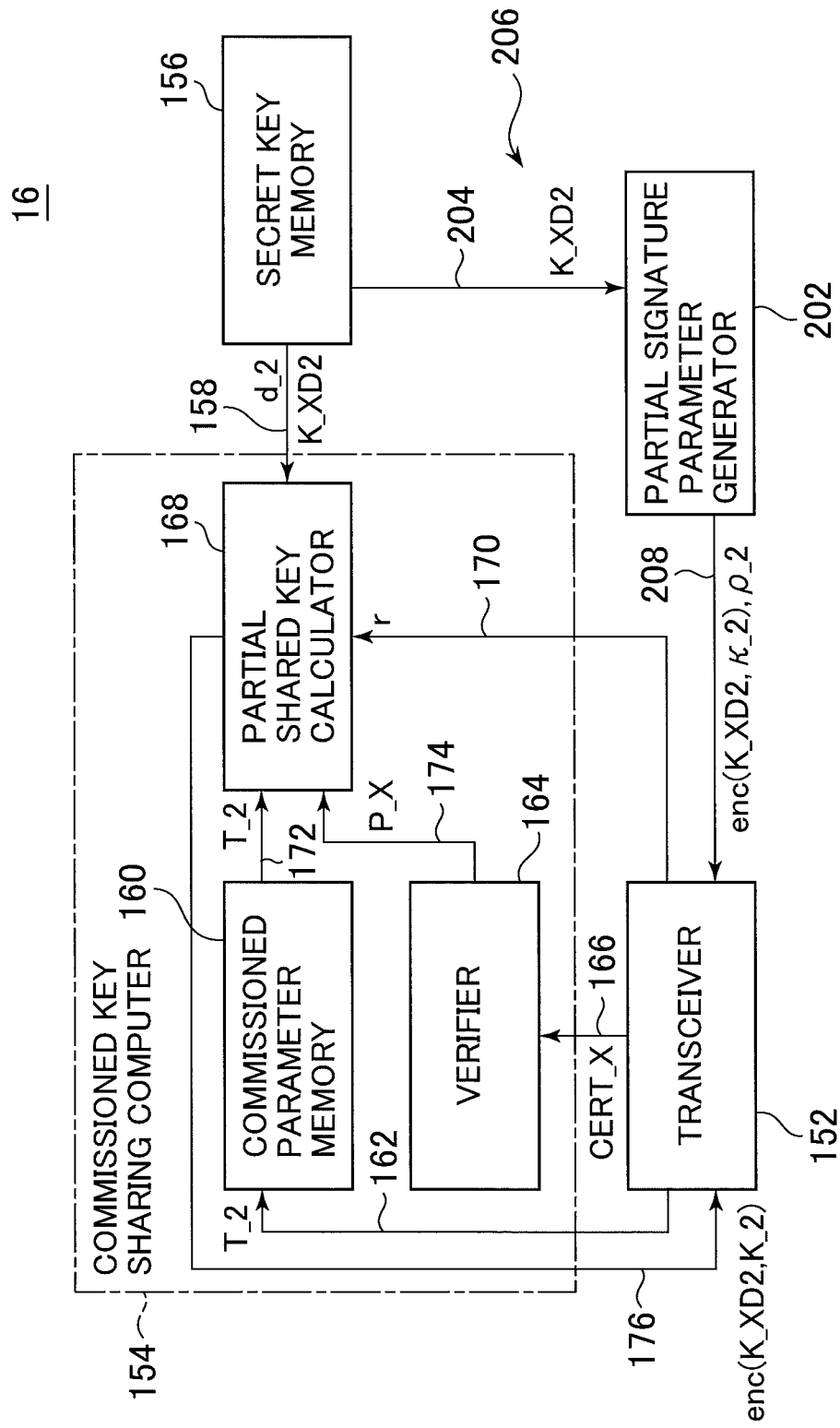
FIG. 5 is a schematic block diagram showing the internal configuration of a commissioned secondary computer according to the embodiment.

Next, an internal configuration of the commissioned secondary computer 16 in this embodiment will be described below with reference to FIG. 5. The commissioned secondary computer 16 has a transceiver 152 for transmitting and receiving information according to a communication protocol so that the secondary computer 16 can communicate with the communicator 12 and the commissioned primary computer 16.

The commissioned secondary computer 16 includes a commissioned key sharing computer 154 to which calculations required for the key sharing are commissioned from the communicator 12.

The commissioned secondary computer 16 includes a secret key memory 156 for securely storing at least the secret key d_2 in a public key pair consisting of the secret key d_2 and the public key P_D2=g^d_2.

The memory 156 is connected via a communication line 158 with the commissioned key sharing computer 154 and can deliver the public key pair consisting of the secret key d_2 and the public key P_D2=g^d_2. For this reason, in the board meaning, the secret key memory 156 can be also included in the commissioned key sharing generator 154. The secret key memory 156 may store the key K_XD2 preshared with the communicator 12.

The commissioned key sharing computer 154 has a commissioned parameter memory 160 for storing the commissioned parameter information T_2, which is supplied from the communicator 12 to the commissioned secondary computer 16. The commissioned parameter memory 160 has an input 162 connected to an output of the transceiver 152 and receives the information T_2 from the transceiver 152.

In this embodiment, the transceiver 152 receives the information T_2 from the communicator 12 by way of a communication path 22 connected with the communicator 12. However, the information T_2 may be set from an input interface such as USB memory or another external memory device. The commissioned parameter memory 160 is not required to provide secured management to prevent leakage of the information T_2.

The commissioned key sharing computer 154 has a verifier 164 connected via a communication line 166 to an output of the transceiver 152. The verifier 164 can obtain the public key certificate CERT_X for the communicator 12 on the transceiver 152 to verify the signature on the obtained certificate.

The commissioned key sharing computer 154 has a partial shared key calculator 168 for calculating the partial shared key information K_2. The partial shared key calculator 168 has the input 158 connected with the secret key memory 156 to receive the secret key d_2 and the shared key K_XD2. The preshared key information K_XD2 may be derived according to following Expression 10 without storing the shared key K_XD2 in the secret key memory 156.

$$K\_XD2 = F(P\_X\hat{} d\_2) \quad (10)$$

Furthermore, the calculator 168 has an input 170 connected with the transceiver 152 to receive the key sharing parameter r.

The calculator 168 further has an input 172 connected with the commissioned parameter memory 160 to receive the commissioned parameter T_2. The calculator 168 further has an input 174 connected with the verifier 164 to receive the public key P_X for the communicator 12, the public key P_X being obtained when the verifier 164 verifies the signature on the public key certificate CERT_X for the communicator 12.

Next, according to following Expression 11, the calculator 168 derives the partial shared key information K_2. The calculator 168 further performs encryption of the information K_2 by using the key K_XD2.

$$enc(K\_XD2, K\_2), \text{ where}$$

$$K\_2 = Z\_2\hat{} r$$

$$Z\_2 = dec(K\_XD, T\_2) \quad (11)$$

The partial shared key calculator 168 has an output 176 connected with the transceiver 152. The partial shared key information enc(K_XD2, K_2) encrypted by the calculator 168 is delivered on the transceiver 152 to the communicator 12.

However, the information enc(K_XD2, K_2) may be delivered to the commissioned primary computer 14 and thence to the communicator 12.

Figure 6:
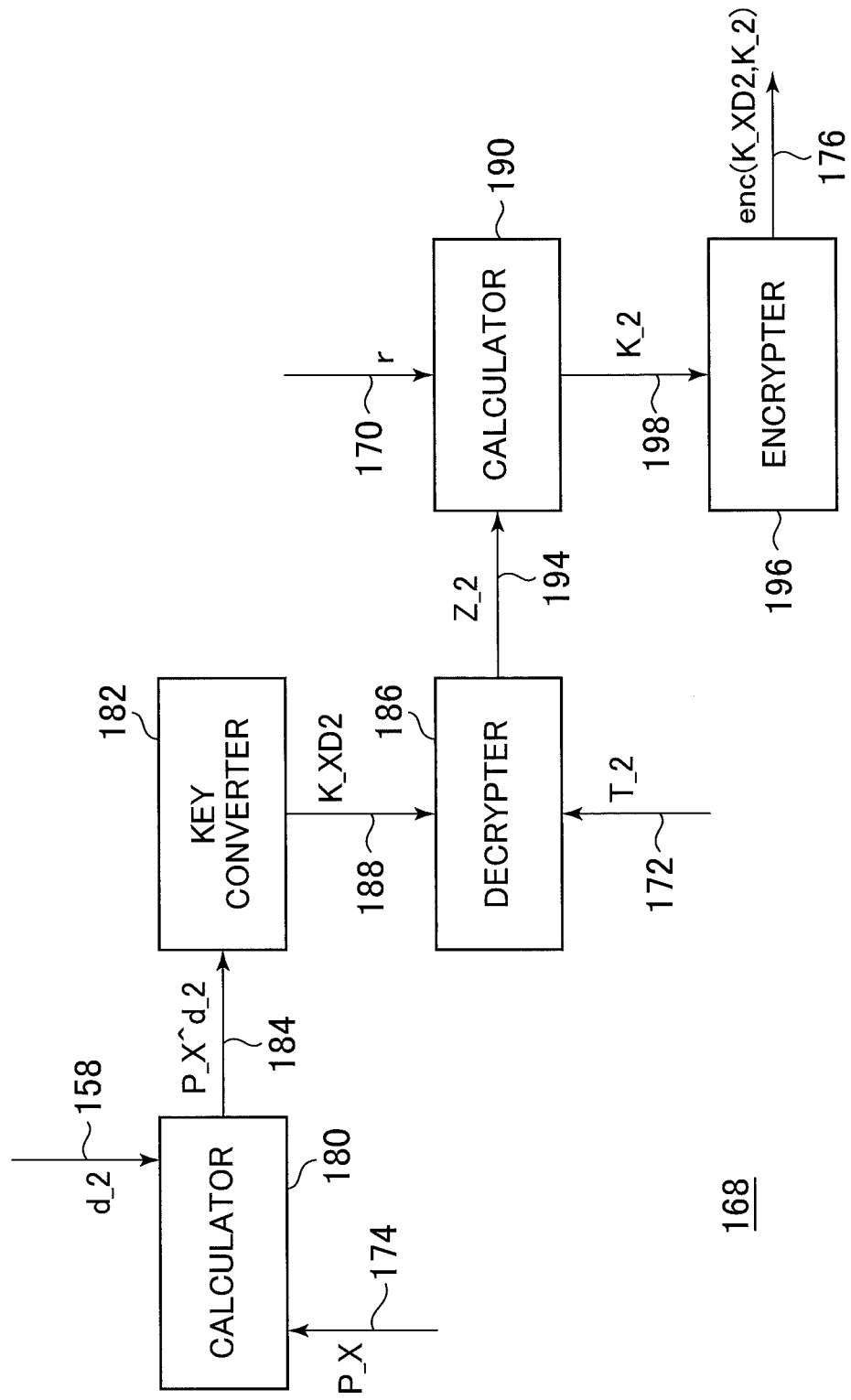
FIG. 6 is a schematic block diagram showing the internal configuration of the partial shared key calculator shown in FIG. 5.

The internal constitution of the partial shared key calculator 168 in this embodiment will be described in detail, with reference to FIG. 6. The calculator 56 capable of deriving the key bit sequence information K_XD2 is shown in FIG. 6.

The partial shared key calculator 168 includes a calculator 180 for receiving the secret key d_2 and the public key P_X for the communicator 12 and calculating P_X^d_2 on the basis of the secret key d_2 and the public key P_X.

The partial shared key calculator 168 includes a key converter 182 connected via a communication line 184 to the calculator 180. The key converter 182 converts the result calculated by the calculator 180 into the public key information K_XD2.

The partial shared key calculator 168 includes a decrypter 186 connected via a communication line 188 to the key converter 182. The decrypter 186 is also connected via the line 172 with the commissioned parameter memory 160 to receive the commissioned parameter T_2. The decrypter 186 decrypts the parameter T_2 to derive the decrypted result Z_2.

The partial shared key calculator 168 includes another calculator 190 connected via a communication line 194 with the decrypter 186. The calculator 190 is further connected via the line 170 with the transceiver 152 to receive the key sharing parameter r. The calculator 190 derives the partial shared key K_2 on the basis of the decrypted result Z_2 and the parameter r.

The partial shared key calculator 168 includes an encrypter 196 connected via a communication line 198 to the calculator 190. The encrypter 196 encrypts the partial shared key K_2 received from the calculator 190. The encrypted partial shard key is delivered on the line 176 to the transceiver 152 thence to the communicator 12.

In the meanwhile, the structure of the partial shared key calculator 116 in the commissioned primary computer 14 can be similar to that of the calculator 168 in the commissioned secondary computer 16.

The commissioned secondary computer 16 includes a partial signature parameter generator 202 connected via a communication line 204 to the secret key memory 156. The generator 202 receives the shared key K_XD2 from the secret key memory 156. Thus, the partial signature parameter generator 202 cooperated with the secret key memory 156 can be regarded as a commissioned signature generation computer 206.

The partial signature parameter generator 202 generates the parameter κ_2 at random as a sort of partial digital signature computational parameter information and further the partial digital signature parameter information ρ_2 according to following Expression 12. The generator 202 further encrypts the partial digital signature computational parameter information κ_2 with the key K_XD2 previously shared with the communicator 12.

$$\rho\_2 = g\hat{} \kappa\_2$$

$$enc(K\_XD2, \kappa\_2) \quad (12)$$

The partial signature parameter generator 202 has an output 208 connected with the transceiver 152 to transmit ρ_2 and enc(K_XD2, κ_2) via the transceiver 152 to the communicator 12. However, the encrypted information enc(K_XD2, κ_2) may be delivered to the commissioned primary computer 14 and thence to the communicator 12.

Figure 7:
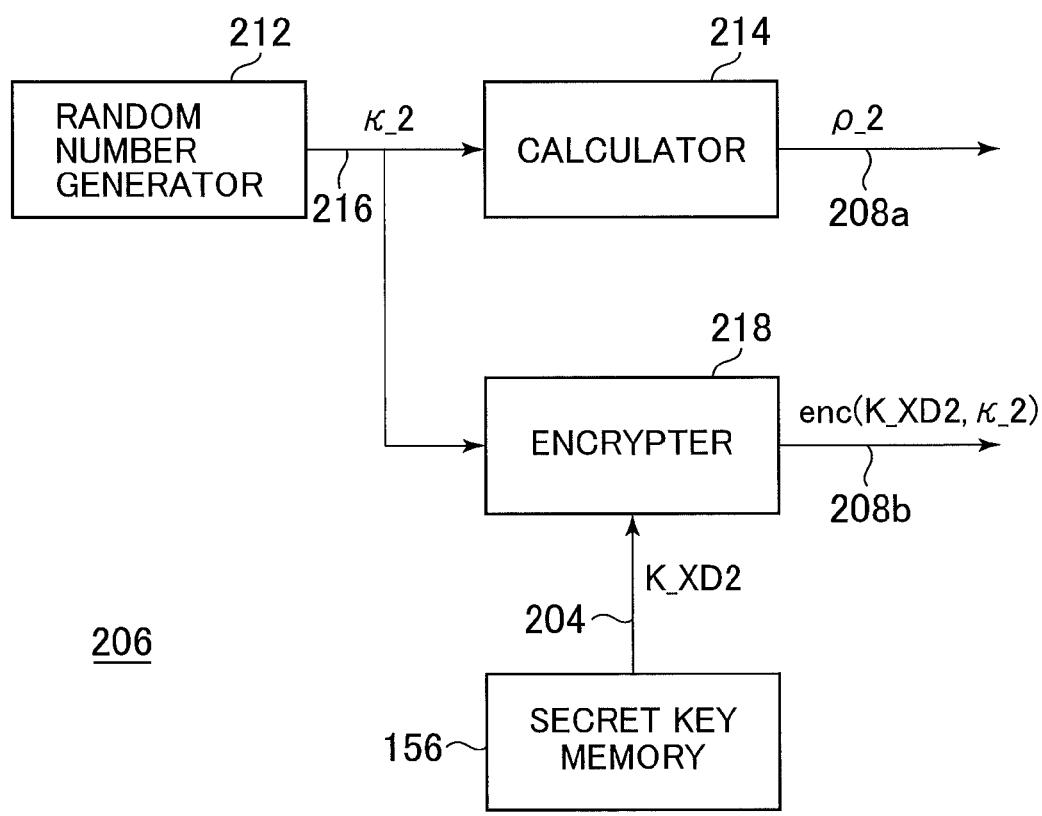
FIG. 7 is a schematic block diagram showing the internal configuration of the partial signature parameter generator shown in FIG. 5.

The internal constitution of the partial signature parameter generator 202 in this embodiment will be described in detail, with reference to FIG. 7.

The partial signature parameter generator 202 includes a random number generator 212 for generating information on a random number indicated as κ_2.

The partial signature parameter generator 202 includes a calculator 214 connected via a communication line 216 with the random number generator 212. The calculator 214 derives the partial digital signature parameter information ρ_2 on the basis of the received computational parameter κ_2 and the generator g.

The calculator 214 has a communication line 208a constituting the line 208 to deliver the calculated parameter information ρ_2 to the transceiver 152.

The partial signature parameter generator 202 includes an encrypter 218 for encrypting the computational parameter κ_2 received on the line 216 from the random number generator 212 with the shared key K_XD2.

The encrypter can be connected via the line 204 with the secret key memory 156 to receive the shared key K_XD2. The shared key K_XD2 can be previously stored in the secret key memory 156. Otherwise, the shared key K_XD2 can be calculated in the commissioned partial shared key calculator 168 or a similar device and then delivered to the secret key memory 156. The commissioned partial shared key calculator 168 can have a plurality of calculators for calculating the shared key K_XD2.

The encrypter 218 has a communication line 208b constituting the line 208 to deliver the encrypted the computational parameter information κ_2 to the transceiver 152.

In the meanwhile, the structure of the partial signature parameter generator 136 in the commissioned primary computer 14 can be similar to that of the parameter generator 202 in the commissioned secondary computer 16.

Figure 8:
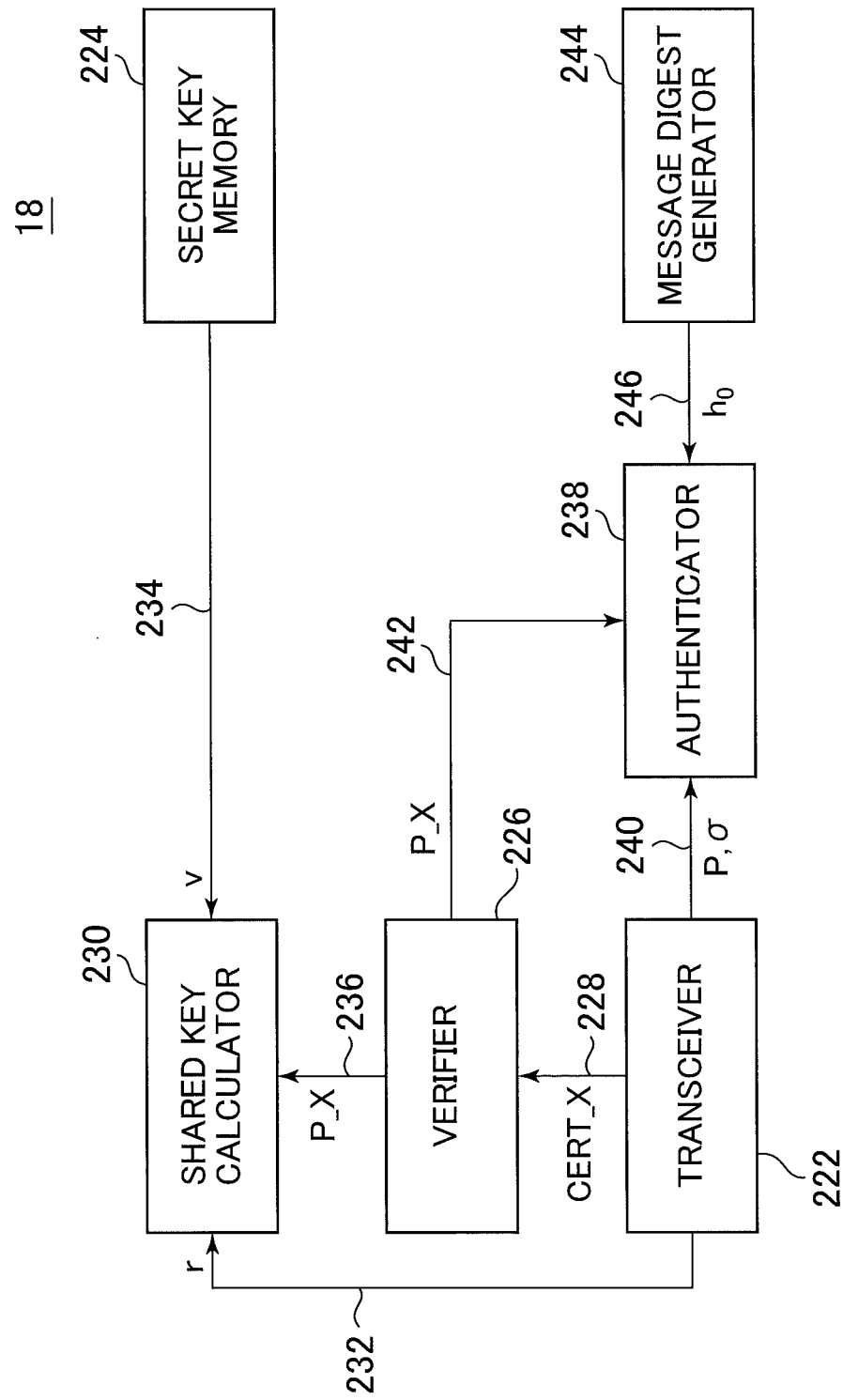
FIG. 8 is a schematic block diagram showing the internal configuration of a destination communicator according to the embodiment.

Next, the internal configuration of the communicator 18 in this embodiment will be described below with reference to FIG. 8. The communicator 18 has a transceiver 222 for performing communications at least with the commissioned primary computer 14 by using a given communication protocol.

The communicator 18 has a secret key memory 224 for securely storing at least secret key out of a public key pair issued from the certificate authority of the PKI.

The communicator 18 has a verifier 226 for obtaining an arbitrary public key certificate and then verifying the signature on the obtained certificate. The verifier 226 has an input 228 connected with the transceiver 222 to receive the public key certificate. When the communicator communicates with the communicator 12, the verifier 226 receives the public key certificate CERT_X for the communicator 12.

The communicator 18 has a shared key calculator 230 for calculating the shared key K. The share key calculator 230 is connected via a communicating line 232 with the transceiver 222 to receive the key sharing parameter r supplied from the commissioned primary computer 14. The share key calculator 230 is further connected via a communicating line 234 with the secret key memory 224 to receive the secret key v for the communicator 18 from the memory 224. Moreover, The share key calculator 230 is connected via a communicating line 236 with the verifier 226 to receive the public key P_X for the communicator 12 verified by the verifier 226.

On the basis of the key sharing parameter r, the secret key v and the public key P_X, the share key calculator 230 derives the shared key K according to following Expression 13.

$$K = (P\_X \hat{} rv) \quad (13)$$

The communicator 18 includes an authenticator 238 for authenticating the digital signature information (ρ, σ) supplied from the communicator 12. The authenticator 238 is connected via a communication line 240 to the transceiver 222 and receives the digital signature information (ρ, σ).

The authenticator 238 is also connected via a communication line 242 to the verifier 226 and receives the public key P_X for the communicator 12 from the transceiver 222.

The communicator 18 has a message digest generator 244 for generates a hash value h of a given message by using a hash function. The generator 244 is connected via a communication line 246 to the authenticator 238 and then gives generated message digest $h_o$ to the authenticator 238.

The authenticator 238 makes a decision as to whether following identity Expression 14 holds on the basis of the received information.

$$\rho\hat{}\sigma = (g\hat{}h_o) \cdot (P\_X\hat{}\rho) \quad (14)$$

However, where the signature algorithm is ECDSA, the authenticator 238 makes a decision as to whether or not the first component of a rational point vector V, which is calculated using following Expression 15 instead of Expression 14, is equal to the parameter information ρ.

$$V = G\hat{}\omega + P\_X\hat{}\zeta, \text{ where}$$

$$\omega = h_0\delta, \zeta = \rho\delta,$$

$$\exists \delta\, s.t.\, \sigma * \delta = 1 (\bmod n) \quad (15)$$

Figure 9:
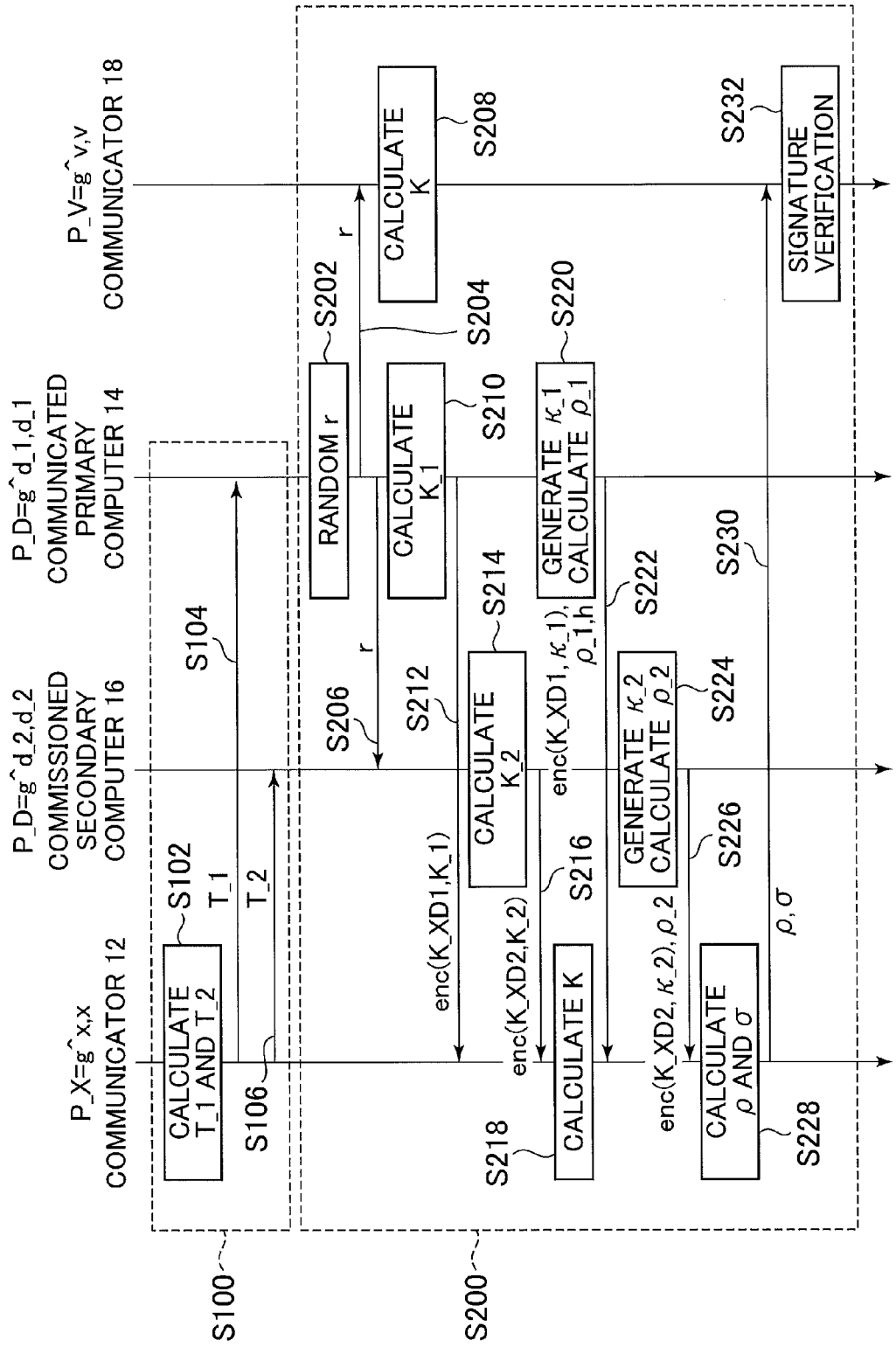
FIG. 9 is a sequence diagram illustrating key sharing and authentication processes according to the embodiment.

Next, operations of the embodiment of the present invention will be described in detail with reference to FIG. 9. FIG. 9 is a sequence diagram illustrating key sharing and authentication processes of this embodiment.

Firstly, a preparatory process (step S100) required for key sharing and authentication processes will be described below. The communicator 12 generates the commissioned parameter information T_1 to be supplied to the commissioned primary computer 14 and commissioned parameter information T_2 to be supplied to the commissioned secondary computer 16 (step S102).

The communicator 12 delivers the information T_1 and T_2 to the commissioned primary computer 14 (step S104) and the commissioned secondary computer 16 (step S106), respectively.

Now, one example of method of generating the information, T_1 and T_2, will be described in detail. Referring again to FIG. 2, in the communicator 12, the verifier 52 receives the public key certificate CERT_D1 for the commissioned primary computer 14, the public key certificate CERT_D2 for the commissioned secondary computer 16 and the public key certificate CERT_V for the communicator 18 on the transceiver 28.

Then, the verifier 52 verifies the obtained public key certificates CERT_D1, CERT_D2 and CERT_V. The verifier 52 further supplies the public key P_D1 for the commissioned primary computer 14, the public key P_D2 for the commissioned secondary computer 16 and the public key P_V for the communicator 18 to the commissioned parameter generator 56.

The commissioned parameter generator 56 generates commissioned parameter information T_1 and T_2 according to Expressions 2 and 3 on the basis of the public keys P_D1, P_D2 and P_V supplied from the verifier 52 and the secret key x supplied from the secret key memory 46 (step S102).

The commissioned parameter generator 56 delivers the generated parameter information T_1 and T_2 to the commissioned primary computer 14 (step S104) and the commissioned secondary computer 16, respectively (step S106).

At this time, the commissioned primary computer 14 stores the received information T_1 in the commissioned parameter memory 106. Similarly, the commissioned secondary computer 16 stores the received information T_2 in the commissioned parameter memory 160. The procedure of the preparatory process has been described so far.

It is not always necessary that the preparatory process be carried out in the communicator 12. Any apparatus including functions corresponding to those of the secret key memory 46, the divider 54 and the commissioned parameter generator 56 can be adapted to carry out the preparatory process. In this embodiment, the communicator 12 executes the preparatory process.

Subsequently, key sharing and authentication processes performed in the system 10 will be described below. In the commissioned primary computer 14, the key sharing parameter generator 110 randomly generates an integer r ($2 \leq r \leq n-1$)

used for the key sharing with the communicator 18 (step S202). The commissioned primary computer 14 delivers the generated integer r as a shared key parameter to the communicator 18 (step S204) and the commissioned secondary computer 16 (step S206).

In the communicator 18, the verifier 226 acquires the public key certificate CERT_X for the communicator 12 received by the transceiver 222 and supplies the public key P_X for the communicator 12 to the shared key calculator 230.

In the communicator 18, the shared key calculator 230 derives the shared key K according to Expression 13 with the shared key parameter r received from the commissioned primary computer 14, the public key P_X for the communicator 12 supplied from the verifier 226 and the secret key v read out from the secret key memory 224 (step S208).

In the commissioned primary computer 14, the partial shared key calculator 116 derives the partial shared key K_1 according to Expression 8 with the commissioned parameter T_1 read from the commissioned parameter memory 106, the secret key d_1 read from the secret key memory 104, the key sharing parameter r generated at step S202 and the public key P_X for the communicator 12 derived by the verifier 112 (step S210).

The calculator 116 encrypts the result K_1 of the above calculation with the key K_XD1 previously shared with the communicator 12 to deliver the encrypted information enc (K_XD1, K_1) to the communicator 12 (step S212).

In the commissioned secondary computer 16, the partial shared key calculator 168 delivers the partial shared key K_2 according to Expression 11 with the commissioned parameter T_2 read from the commissioned parameter memory 160, the secret key d_2 read from the secret key memory 156, the key sharing parameter r generated at step S202 and the public key P_X received by the verifier 164 (step S214).

The partial shared key calculator 168 encrypts the result K_2 of the above calculation with the key K_XD2 previously shared with the communicator 12 to deliver the encrypted information enc(K_XD2, K_2) to the communicator 12 (step S216).

In the communicator 12, the partial shared key decrypter 58 decrypts the partial shared key information, which is enc (K_XD1, K_1) and enc(K_XD2, K_2) encrypted with the preshared keys K_XD1 and K_XD2, respectively. The decrypter 58 supplies the decrypted information K_1 and K_2 to the shared key synthesizer 60. The synthesizer 60 derives the shared key K according to Expression 4 with the partial shared keys K_1 and K_2. The calculated information K is stored in the secret key memory 46 (step S218).

Then, in the commissioned primary computer 14, the partial signature parameter generator 136 randomly generates integer κ_1 as one of the partial digital signature computational parameters for the commissioned primary computer 14 within a domain of 2≤κ_1≤n−1. The generator 136 further derives the partial digital signature parameter ρ_1 according to Expression 9 with the parameter κ_1 (step S220).

The generator 136 encrypts the parameter κ_1 with the preshared key K_XD1 stored in the secret key memory 104 to deliver the encrypted information enc(K_XD1, κ_1) to the communicator 12. The generator 208 further delivers the derived parameter ρ_1 to the communicator 12. In addition, the message digest generator 132 calculates the hash value h of the given message information to deliver the hash value h as message digest to the communicator 12 (step S222).

In the commissioned secondary computer 16, the partial signature parameter generator 202 randomly generates integer κ_2 as one of the partial digital signature computational parameters for the commissioned secondary computer 16 within the domain of 2≤κ_2≤n−1, in the same way as for the commissioned primary computer 14. In addition, the generator 202 further derives the partial signature parameter information ρ_2 according to Expression 12 with the parameter κ_2 (step S224).

The generator 202 encrypts the integer κ_2 with the preshared key K_XD2 stored in the secret key memory 156 to deliver the encrypted information enc (K_XD2, κ_2) to the communicator 12. The generator 202 further delivers the derived parameter ρ_2 to the communicator 12 (step S226).

In the communicator 12, the partial signature parameter decrypter 66 decrypts the encrypted information enc (K_XD1, κ_1) supplied from the commissioned primary computer 14 by using the secret key K_XD1 in the secret key 46. The decrypter 66 further decrypts the encrypted information enc (K_XD2, κ_2) supplied from the commissioned secondary computer 16 by using the secret key K_XD2 in the memory 46.

The signature parameter synthesizer 68 derives parameter information ρ and κ according to Expression 5 by using the decrypted partial signature parameter information ρ_1, ρ_2, κ_1 and κ_2. Furthermore, the signature generator 110 derives parameter information σ according to Expression 6 by using the message digest h and the derived information ρ and κ (step S228).

The communicator 12 delivers the derived digital signature information (ρ, σ) to the communicator 18 (step S230).

In the communicator 18, the authenticator 238 receives the digital signature information ρ and σ from the communicator 12. The verifier 226 obtains the public key certificate for the communicator 12 to read out the public key P_V from the certificate and deliver the public key P_V to the authenticator 238. The message digest generator 244 calculates the message digest value $h_o$ to deliver the value $h_o$ to the authenticator 238.

The authenticator 238 makes a decision as to whether the equality of Expression 14 holds. If the equality holds, the authentication succeeds. If not so, the authentication fails (step S232).

Due to the constitution and operations of this embodiment in accordance with the present invention, this embodiment has the following advantages.

The partial secret key information used for calculation of the partial shared keys K_1 and K_2 are only secret keys d_1 and d_2, respectively.

Neither commissioned computer can know the shared key K because the respective results of calculations performed by the commissioned computers 14 and 16 are received and combined together by the communicator 12. Therefore, if one of the commissioned computers is taken over by a cyber attacker, the attacker cannot synthesize the shared key K as long as the other computer is secure.

According to this embodiment, a Diffie-Hellman (or elliptic curve Diffie-Hellman) key sharing protocol and an authenticated key sharing protocol using authentication employing a digital signature can be performed between the communicators 12 and 18 while the communicator 12 commissions both commissioned primary computer 14 and commissioned secondary computer 16 to perform some of computations required for implementation of the protocols.

Computations required to be performed by the communicator 12 are only two computational operations. For example, the computational operations are a computation for decryption of the shared key and a multiplication operation on a finite field. Alternatively, the required operations are adding rational points on an elliptic curve.

Furthermore, information transmitted from the commissioned secondary computer 16 to the communicator 12 is once routed through the commissioned primary computer 14. Thus, the commissioned primary computer 14 transmits the encrypted partial shared key information enc(K_XD1, K_1) and enc(K_XD2, κ_2), the encrypted partial signature parameter information enc(K_XD1, κ_1) and enc(K_XD2, κ_2), the partial signature parameters ρ_1 and ρ_2 and the message digest h as a whole. The communicator 12 delivers the signature parameter information ρ and σ to the commissioned primary computer 14 and thence to the communicator 18. Consequently, the communicator 12 can completely communicate with each commissioned computer by performing only one reciprocating communication.

As described so far, the embodiment of the present invention can provide a system satisfying the above-mentioned five conditions.

Next, an alternative embodiment of a communication system including the commission information generator, the shared key calculator, the signature synthesizer, the commissioned key sharing computer and the commissioned signature generation computer of the present invention will next be described in detail with reference to some drawings.

In this alternative embodiment, some components may be similar to those used in the previous embodiment. Thus, such components in this embodiment are indicated by the same reference numerals as the previous embodiment. Furthermore, their detailed description will not be repeated in order to avoid redundancy.

This embodiment is implemented by using a public key for the communicator 12 as a key sharing protocol, encrypting a premaster secret with the public key and then delivering the encrypted key. In the described example, verification of a digital signature is used as an authentication method in the same way as in the previous embodiment. The whole system configuration of this embodiment may be similar to that of the previous embodiment shown in FIG. 1. Thus, this embodiment will be described also by referring to FIG. 1.

Figure 10:
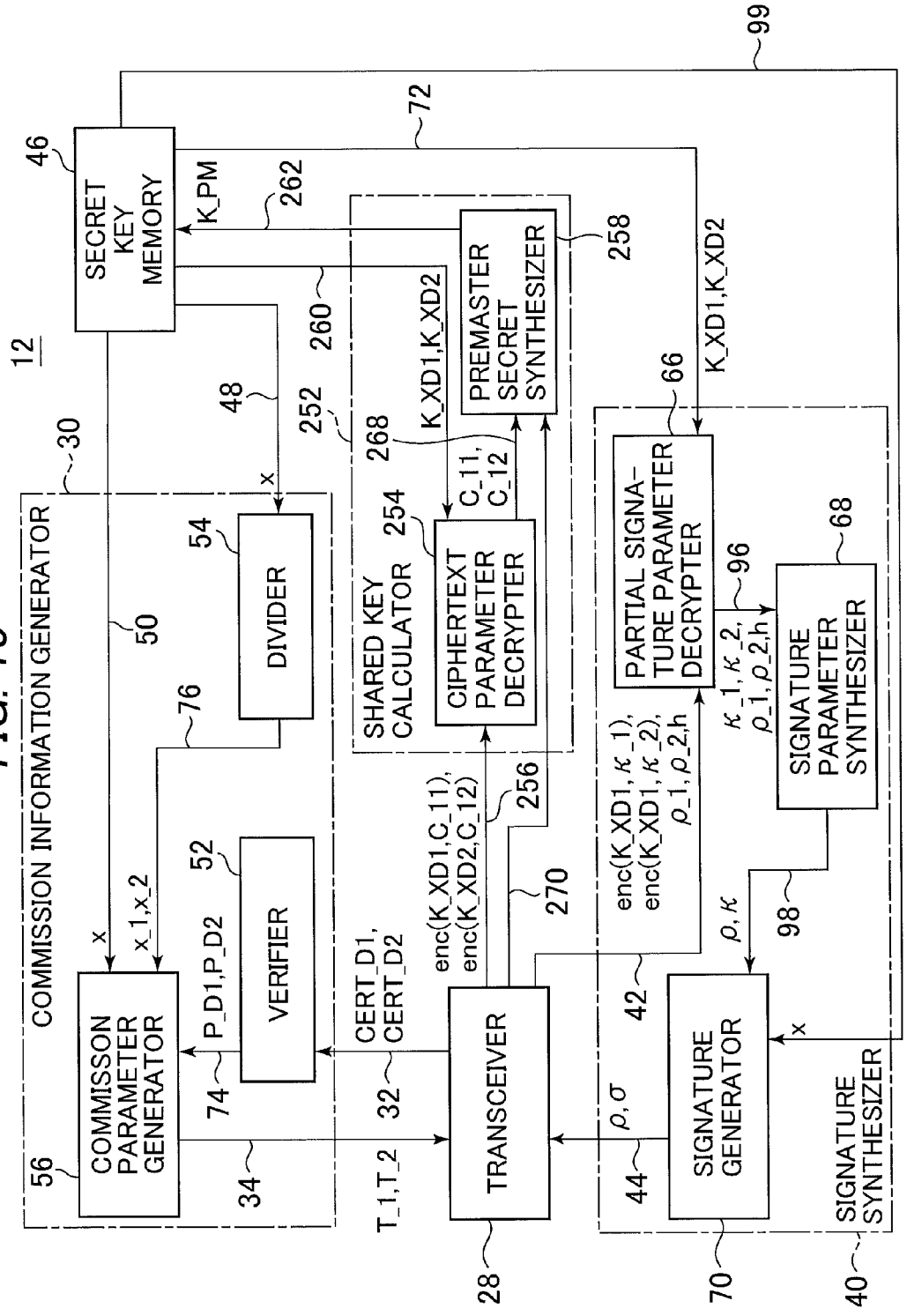
FIG. 10 is a schematic block diagram showing the internal configuration of a source communicator according to an alternative embodiment.

FIG. 10 shows the internal configuration of the communicator 12 in this embodiment. The communicator 12 also has the transceiver 28, the secret key memory 46, the commission information generator 30 and the signature synthesizer 40.

The communicator 12 in this embodiment has the shared key calculator 252, which includes a ciphertext parameter decrypter 254 for decrypting partial ciphertext parameters received from the commissioned primary computer 14. The partial ciphertext parameter decrypter 254 is connected via a communication line 256 with the transceiver 28.

The secret key calculator 252 further includes a premaster secret synthesizer 258 for calculating a premaster secret associated with the communicator 18 on the basis of the decrypted partial ciphertext parameters.

The shared key calculator 252 in this embodiment is connected to the secret key memory 46 via an input line 260 and an output line 262 for communicating information between the memory 46 and the calculator 252. As is the case with the previous embodiment, in the board meaning, the secret key memory 46 is also included in the shared key calculator 252.

In this embodiment, the commissioned parameter generator 56 receives the secret key x from the secret key memory 46, the secret key information x_1 and x_2 divided by the divider 54. The generator 56 further receives from the verifier 52 the public key P_D1 for the commissioned primary computer 14 and the public key P_D2 for the commissioned secondary computer 16. The generator 56 then generates the commissioned parameter information T_1 and T_2 on the basis of the received information.

More specifically, the commissioned parameter generator 56 generates the commissioned parameter information T_1 according to Expression 16 to deliver the generated information T_1 on the transceiver 28 to the commissioned primary computer 14.

$$T\_1 = enc(K\_XD1, x\_1), \text{ where}$$

$$K\_XD1 = F(P\_D1\hat{~}x) \qquad (16)$$

Furthermore, the commissioned parameter generator 56 generates the commissioned parameter information T_2 according to Expression 17 to deliver the generated information T-2 on the transceiver 28 to the commissioned secondary computer 16.

$$T\_2 = enc(K\_XD2, x\_2), \text{ where}$$

$$K\_XD2 = F(P\_D2\hat{~}x) \qquad (17)$$

In these Expressions, F(x) is the conversion function also adopted in the previous embodiment. In the same way as in the previous embodiment, the key information K_XD1 and K_XD2 may be previously stored in the secret key memory 104.

Figure 11:
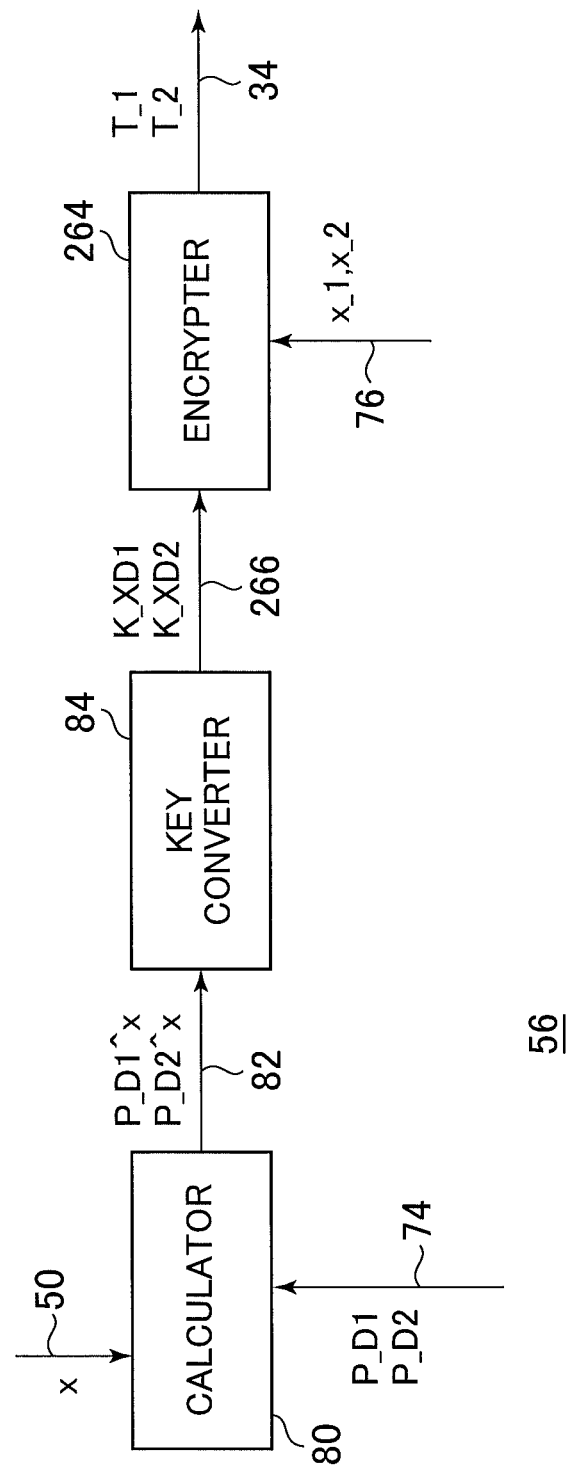
FIG. 11 is a schematic block diagram showing the internal configuration of the commission parameter generator shown in FIG. 10.

An constructive of the commission parameter generator 56 in this embodiment will be described in detail with reference to FIG. 11, in which the generator 56 capable of deriving the key bit sequence information K_XD1 and K_XD2 is shown.

In common with the previous embodiment, the commission parameter generator 56 in this embodiment can include the calculator 80 for performing a calculation on the basis of the secret key x and public keys P_D1 and P_D2 received on the lines 50 and 74, respectively, and the key converter 84 for converting the results calculated by the calculator 80 into public keys K_XD1 and K_XD2.

The generator includes an encrypter 264 for encrypting the divided secret keys x_1 and x_2 received on the line 76. The encrypter 264 is further connected via a line 266 with the key converter 84 to receive the public keys K_XD1 and K_XD2 and use them for the encryption. The encrypted information is transmitted as the commissioned parameter information T_1 and T_2 on the line 34 to the transceiver 28.

The ciphertext parameter decrypter 254 receives encrypted partial ciphertext parameter information enc(K_XD1, C_11) from the commissioned primary computer 14 on the transceiver 28 to decrypt the information enc(K_XD1, C_11) into partial ciphertext parameter information C_11.

The encrypted partial ciphertext parameter information enc (K_XD1, C_11) is obtained by encryption using the key K_XD1 previously shared between the commissioned primary computer 14 and the communicator 12. The ciphertext decrypter 254 performs decryption with the secret key K_XD1 stored in the secret key memory 46.

The ciphertext decrypter 254 receives encrypted partial ciphertext parameter information enc(K_XD2, C_12) from the commissioned secondary computer 16 via the transceiver 28 to decrypt the information enc(K_XD2, C_12) into partial ciphertext parameter information C_12 with the secret key K_XD2 used.

The ciphertext decrypter 254 is connected via a communication line 268 to the premaster secret synthesizer 258 to supply the decrypted partial ciphertext parameter information C_11 and C_12 to the synthesizer 258.

The premaster secret synthesizer 258 receives the decrypted C_11 and C_12 from the ciphertext decrypter 254. The premaster secret synthesizer 258 is further connected via a communication line 270 with the transceiver 28 to receive ciphertext parameter information C_2 supplied from the commissioned primary computer 14. The synthesizer 258 computationally finds premaster secret K_PM associated with the communicator 18 by using following Expression 18.

$$K\_PM = \Gamma \cdot C\_2, \text{ where}$$

$$\exists \Gamma s.t. \Gamma \cdot (C\_11 \cdot C\_12) = e \tag{18}$$

Note that e is a unit element in a group G. Where the encryption algorithm is an elliptic curve ElGamal encryption algorithm, the premaster secret K_PM calculated using Expression 18 gives rational points on an elliptic curve. Thus, it is necessary to convert these rational points into premaster secret as intrinsic bit sequence information. For example, where a Menezes-Vanstone elliptic curve cryptosystem is used, the synthesizer 258 receives ciphertext parameter information C_21 and C_22, described later, and prime number p to decrypt divided premaster secrets K_PM1 and K_PM2 by using following Expression 19. The synthesizer 258 further decodes the premaster secret K_PM by combining the divided premaster secrets K_PM1 and K_PM2 in a manner of the coupling of bit sequences.

$$K\_PM = K\_PM1 \| K\_PM2, \text{ where}$$

$$K\_PM1 = \chi\_1 * C\_21 (\bmod p),$$

$$K\_PM2 = \chi\_2 * C\_22 (\bmod p),$$

$$\exists \chi\_1, \chi\_2 s.t.$$

$$\gamma\_1 * \chi\_1 = 1 (\bmod n),$$

$$\gamma\_2 * \chi\_2 = 1 (\bmod n) \tag{19}$$

In Expression 19, $\gamma\_1$ and $\gamma\_2$ are a first and a second component, respectively, of the rational point vector, which is derived by $C\_11 \cdot C\_12$. The operator $\|$ means the coupling of bit sequences.

Figure 12:
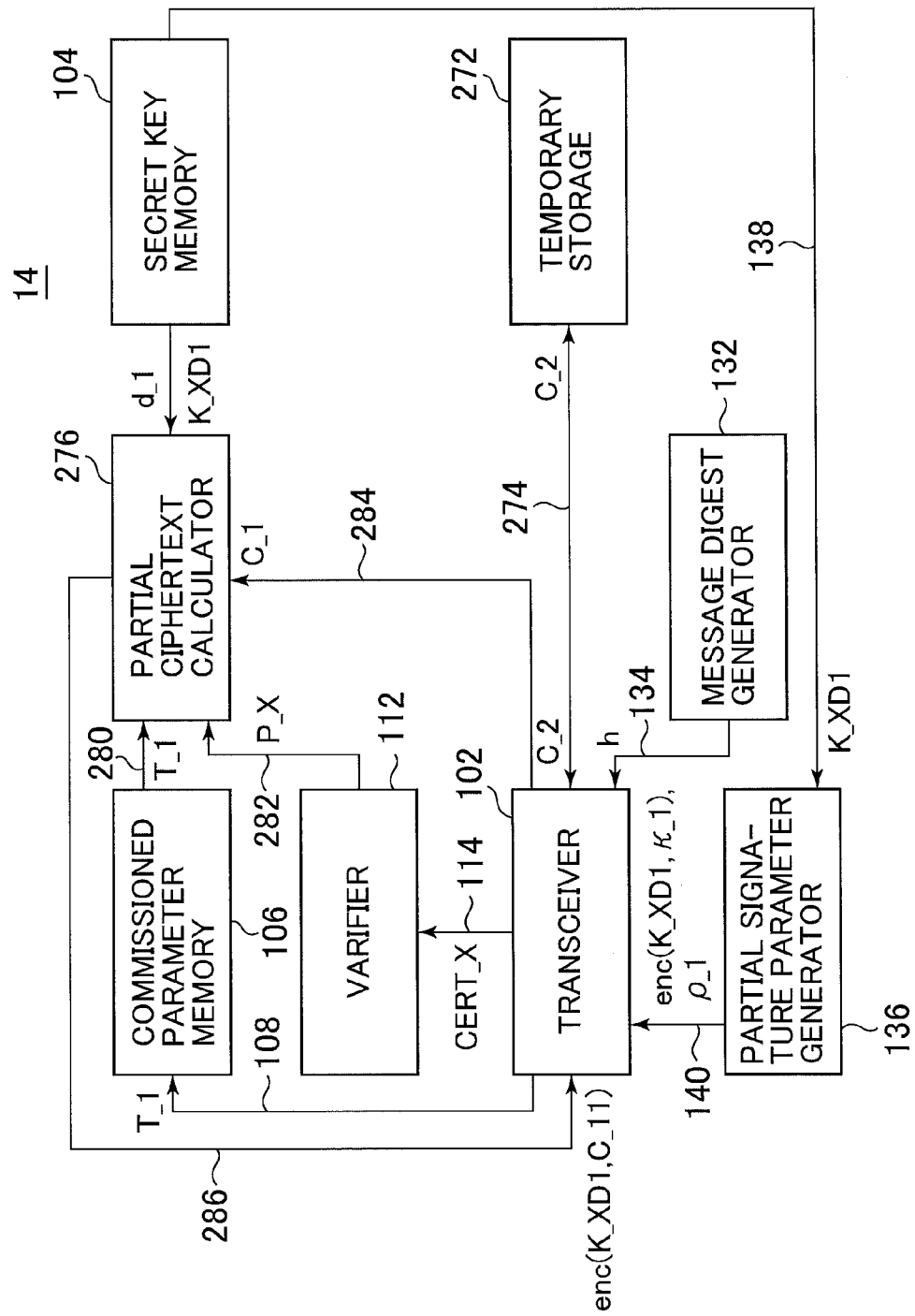
FIG. 12 is a schematic block diagram showing the internal configuration of a commissioned primary computer according to the alternative embodiment.

FIG. 12 shows the internal configuration of the commissioned primary computer 14 in this embodiment. The commissioned computer 14 has the transceiver 102, the secret key memory 104, the commissioned parameter memory 106, the verifier 112, the message digest generator 132 and the partial signature parameter generator 136, in common with the computer 14 in the previous embodiment.

The transceiver 102 receives ciphertext parameter information C_1 and C_2 from the communicator 18, which information is components of a ciphertext generated by the communicator 18.

The commissioned primary computer 14 has a temporary storage 272, which is connected via a communication line 274 with the transceiver 102, for temporarily storing the ciphertext parameter information C_2 received from the communicator 18. When the information C_2 is delivered from the commissioned primary computer 14 to the communicator 12, the information C_2 is readout from the temporary storage 272 to the transceiver 102.

The commissioned primary computer 14 has a partial ciphertext calculator 276 for calculating the partial ciphertext parameter information C_11. The partial ciphertext calculator 276 is connected via the communication lines 278, 280 and 282 with the secret key memory 104, the commissioned parameter memory 106 and the verifier 112, respectively. The partial ciphertext calculator 276 is further connected via a communication line 284 with the transceiver 102 to receive the ciphertext parameter information C_1.

The partial ciphertext calculator 276 derives the partial ciphertext parameter information C_11 according Expression 20 on the basis of the commissioned parameter information T_1 read from the commissioned parameter memory 106, the secret key d_1 read from the secret key memory 104, the public key P_X for the communicator 12 read from the verifier 112 and the ciphertext parameter information C_1 received by the transceiver 102. Furthermore, the calculator 276 encrypts the calculated information C_11 with the key K_XD1 previously shared with the communicator 12, the shared key K_XD1 being stored in the secret key memory 104 and delivered therefrom.

$$enc(K\_XD1, C\_11), \text{ where}$$

$$K\_XD1 = F(P\_X \hat{} d\_1),$$

$$C\_11 = C\_1 \hat{} Y\_1,$$

$$Y\_1 = dec(K\_XD1, T\_1) \tag{20}$$

The partial ciphertext calculator 276 has an output 286 to deliver the encrypted information enc(K_XD1, C_11) on the transceiver 102 to the communicator 12.

As stated above, the commissioned primary computer 16 in this embodiment can be also considered as the invention relating to a commissioned computer including a partial ciphertext calculator for managing partial ciphertext parameters, a message digest generator for generating a message digest on the basis of a given massage and a transceiver for transmitting the partial ciphertext parameters to another commissioned computer and a proxy communicator and the message digest to a proxy communicator.

Figure 13:
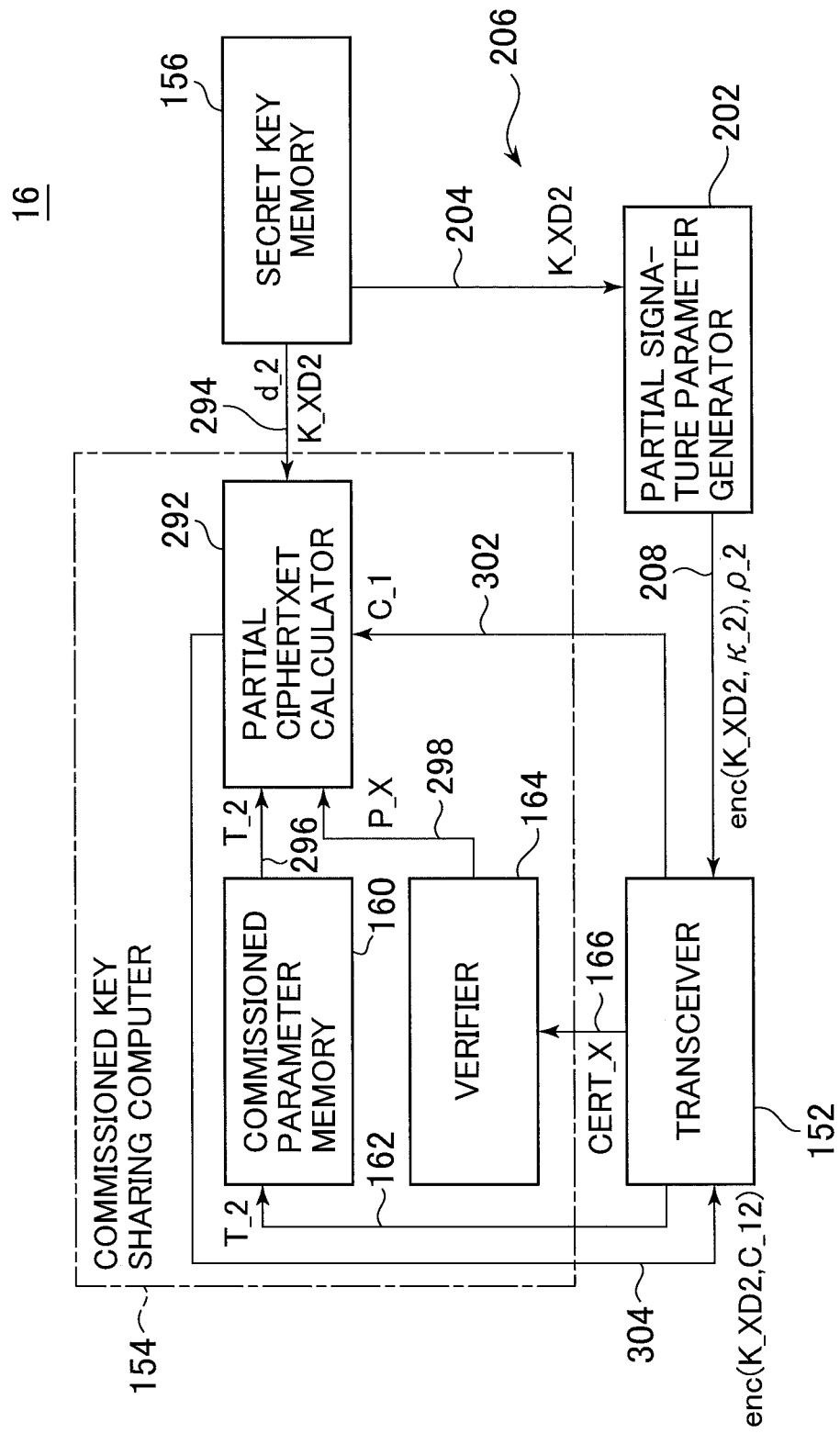
FIG. 13 is a schematic block diagram showing the internal configuration of a commissioned secondary computer according to the alternative embodiment.

FIG. 13 shows the internal configuration of the commissioned secondary computer 16 in this embodiment. The commissioned computer 16 has the transceiver 152, the secret key memory 156, the partial signature parameter generator 202 and the commissioned key sharing computer 154, in common with the computer 16 in the previous embodiment.

In this embodiment, the commissioned key sharing computer 154 includes a partial ciphertext calculator 292 for calculating the partial ciphertext parameter information C_12. The partial ciphertext calculator 292 is connected via communication lines 294, 296 and 298 to the secret key memory 156, the commissioned parameter memory 303 and the verifier 306, respectively. The calculator can receive the secret key d_2 from the secret key memory 156, the commissioned parameter information T_2 from the commissioned parameter memory 160 and the public key P_X for the communicator 12 read from the verifier 164.

The partial ciphertext calculator 292 is further connected via a communication line 302 with the transceiver 152 to receive the ciphertext parameter information C_1 from the transceiver 152, to which the information C_1 is supplied from the communicator 18.

The partial ciphertext calculator 292 further derives partial ciphertext parameter information C_12 according to following Expression 21 on the basis of the received information. Furthermore, the calculator 292 encrypts the information C_12 with the key K_XD2 previously shared with the communicator 12, the shared key K_XD2 being stored in the secret key memory 156 and delivered therefrom.

$$enc(K\_XD2, C\_12), \text{ where}$$

$$K\_XD2 = F(P\_X \hat{} d\_2),$$

$$C\_12 = C\_1 \hat{} Y\_2,$$

$$Y\_2 = dec(K\_XD2, T\_2) \tag{21}$$

The partial ciphertext calculator 292 has an output 304 to deliver the encrypted information enc(K_XD2, C_12) on the transceiver 152 to the communicator 12.

Figure 14:
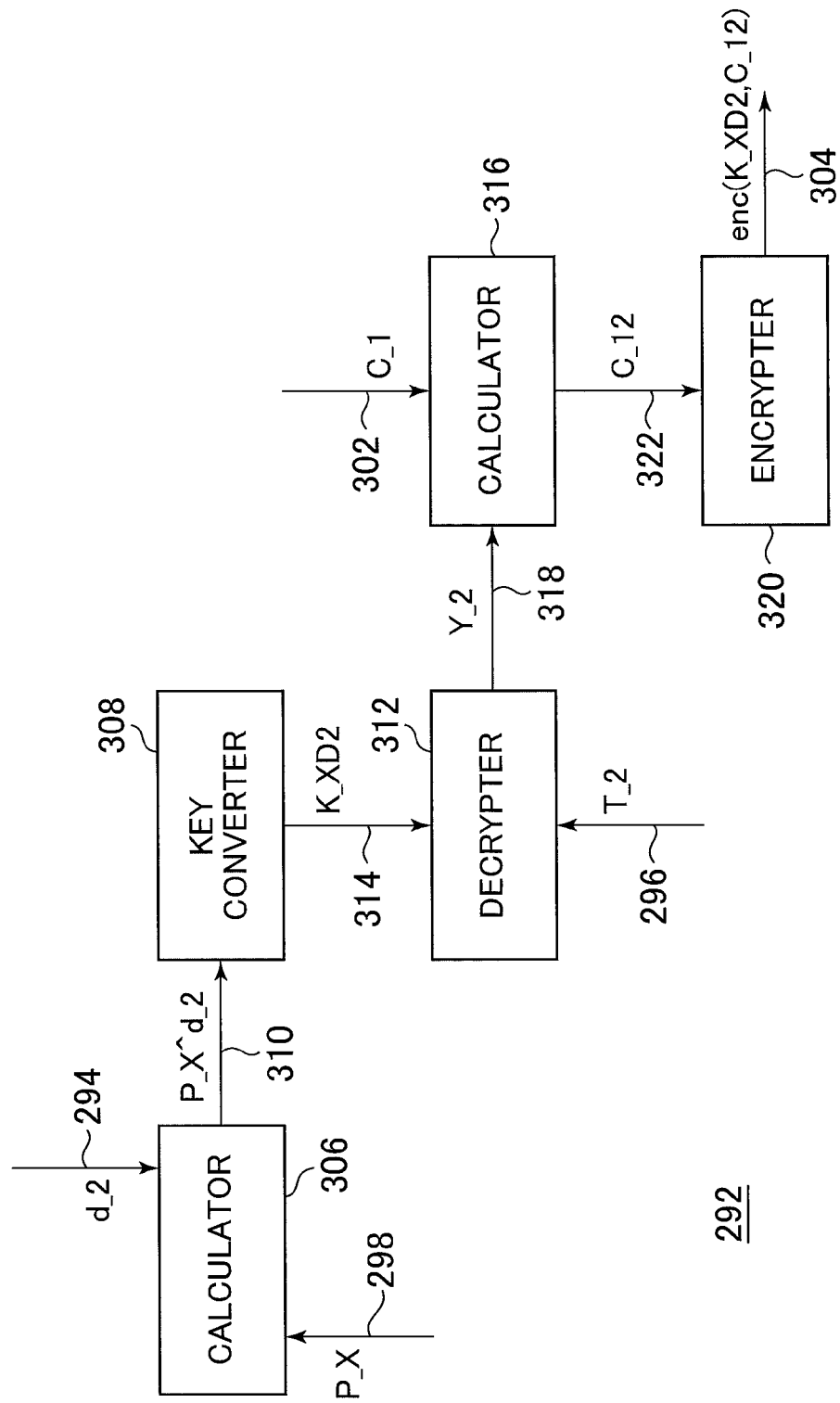
FIG. 14 is a schematic block diagram showing the internal configuration of the partial ciphertext calculator shown in FIG. 13.

The internal constitution of the partial ciphertext calculator 292 in this embodiment will be described in detail, with reference to FIG. 14. The calculator 292 capable of deriving the key bit sequence information K_XD2 is shown in FIG. 14.

The partial ciphertext calculator 292 includes a calculator 306 for receiving the secret key d_2 and the public key P_X for the communicator 12 and calculating P_X^d_2 on the basis of the received keys.

The partial ciphertext calculator 292 includes a key converter 308 connected via a communication line 310 to the calculator 306. The key converter 308 converts the result calculated by the calculator 306 into the public key K_XD2.

The partial ciphertext calculator 292 includes a decrypter 312 connected via a communication line 314 to the key converter 308. The decrypter 312 is also connected via the line 296 with the commissioned parameter memory 160 to receive the commissioned parameter T_2. The decrypter 312 decrypts the parameter T_2 to derive the decrypted result Y_2.

The partial ciphertext calculator 292 includes another calculator 316 connected via a communication line 318 with the decrypter 312. The calculator 316 is further connected via the line 302 with the transceiver 152 to receive the ciphertext parameter information C_1. The calculator 316 derives the partial ciphertext parameter information C_12 on the basis of the decrypted result Y_2 and the ciphertext parameter information C_1.

The partial ciphertext calculator 292 includes an encrypter 320 connected via a communication line 322 to the calculator 316. The encrypter 320 encrypts the partial ciphertext parameter information C_12 received from the calculator 316. The encrypted partial ciphertext parameter is delivered on the line 304 to the transceiver 152 thence to the communicator 12.

In the meanwhile, the structure of the partial ciphertext calculator 276 in the commissioned primary computer 14 can be similar to that of the calculator 292 in the commissioned secondary computer 16.

Figure 15:
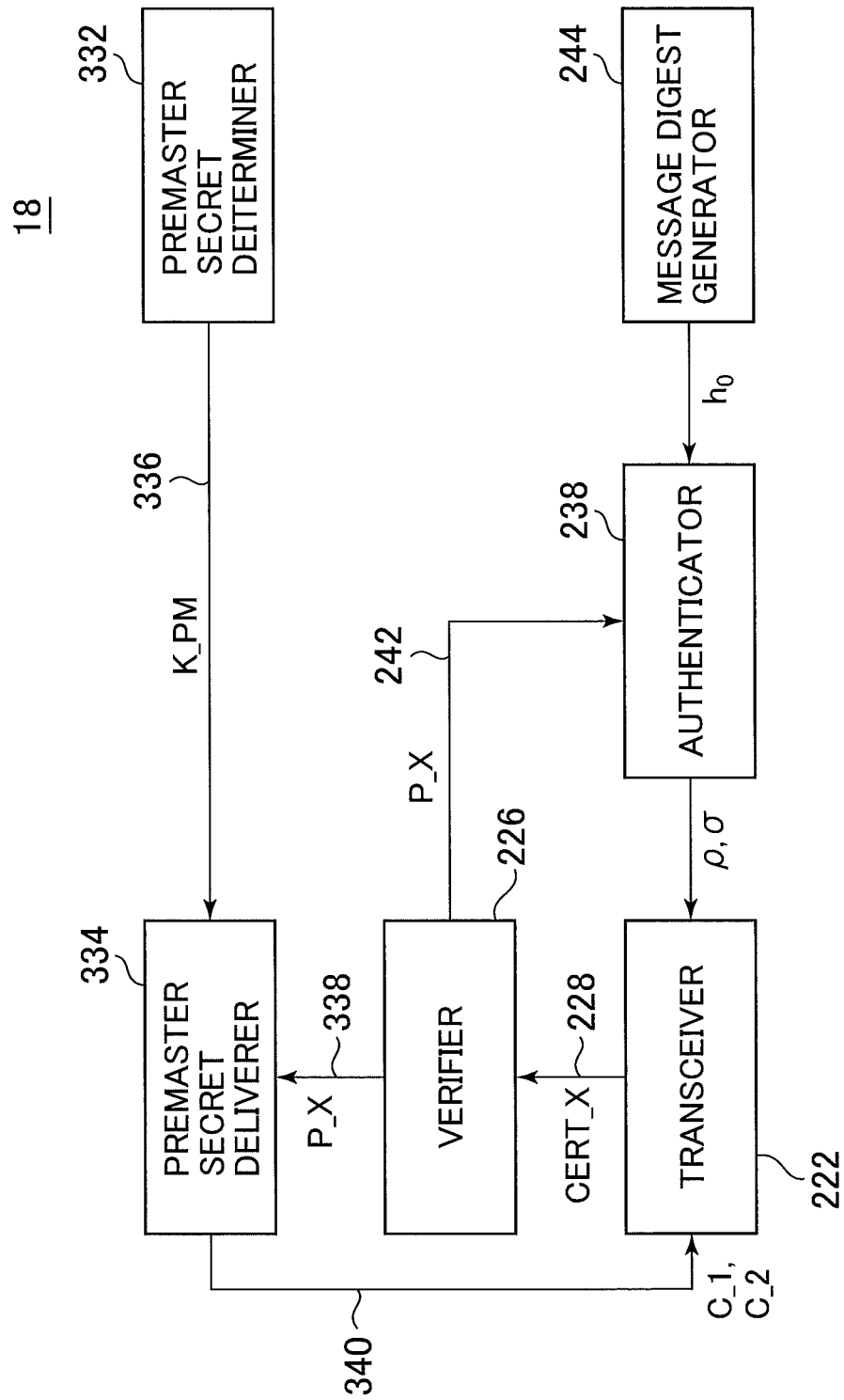
FIG. 15 is a schematic block diagram showing the internal configuration of a destination communicator according to the alternative embodiment.

FIG. 15 shows the internal configuration of the communicator 18 in this embodiment. The communicator 18 in this embodiment has the transceiver 222, the verifier 226, the authenticator 238 and the message digest generator 244 in common with the communicator 18 in the previous embodiment.

The communicator 18 in this embodiment includes a premaster secret determiner 332 for determining a bit sequence K_PM of a given bit length as premaster secret.

The communicator 18 in this embodiment further includes a premaster secret deliverer 334 having an input 336 connected with an output of the premaster secret determiner 332. The communicator 18 is also connected with the output 338 of the verifier 226.

The premaster secret deliverer 334 receives the premaster secret bit sequence K_PM from the premaster determiner 332 and then converts the bit sequence K_PM into an integer within $0 < K\_PM \leq n-1$.

The deliverer 334 also receives the public key P_X for the communicator 12 from the verifier 226 and then determines a random number θ within a domain of $2 \leq \theta \leq n-1$ to make out ciphertexts C_1 and C_2, given by following Expression 22.

$$C\_1 = g^\theta,$$

$$C\_2 = K\_PM \cdot P\_X^\theta \quad (22)$$

The deliverer 334 has an output 340 connected with the transceiver 222 to deliver the determined ciphertexts C_1 and C_2 on the transceiver 222 to the commissioned primary computer 14.

Where the encryption algorithm is an elliptic curve ElGamal encryption algorithm, it cannot be used as it is. Therefore, it is necessary to convert the bit sequence K_PM into rational points on an elliptic curve or to perform another calculation, for example, using Menezes-Vanstone elliptic curve cryptography. In case of the Menezes-Vanstone elliptic curve cryptography is performed, the bit sequence K_PM is divided into bit sequence segments K_PM1 and K_PM2. A first and a second component of a vector calculated using P_X^θ are defined as q_1 and q_2, respectively. For an appropriate prime number p which is 3 or more, the ciphertext parameter information C_21 and C_22 is calculated according to following Expression 23 to deliver the calculated information C_21 and C_22 to the commissioned primary computer 14 together with the ciphertext parameter C_1 and the prime number p.

$$C\_21 = K\_PM1 * \gamma\_1 (\bmod p),$$

$$C\_22 = K\_PM2 * \gamma\_2 (\bmod p), \quad (23)$$

In Expression 23, $\gamma\_1$ and $\gamma\_2$ are a first and a second component, respectively, of a rational point vector calculated using P_X^θ. Bit sequence segments K_PM1 and K_PM2 are obtained by dividing the premaster secret bit sequence K_PM into two by an arbitrary method.

In this embodiment, the communicator 18 includes the premaster secret determiner 332 and the premaster secret deliverer 334 to generate and deliver the determined premaster secret. However, the system can be configured so that the premaster secret is delivered from the communicator 12.

For example, the communicator 12 including the premaster secret determiner 332 generates the premaster secret, encrypts the premaster secret with the preshared key K_XD1 and delivers the encrypted premaster secret to the commissioned primary computer 14. The commissioned primary computer 14 further encrypts the premaster secret with the public key for the communicator 18 to deliver the encrypted information to the communicator 18.

Alternatively, the commissioned primary computer 14 including the premaster secret determiner 332 can determine the premaster secret. In this case, the commissioned primary computer 14 encrypts the determined premaster secret with the public key for the communicator 18 and delivers the encrypted premaster secret to the communicator 18.

Figure 16:
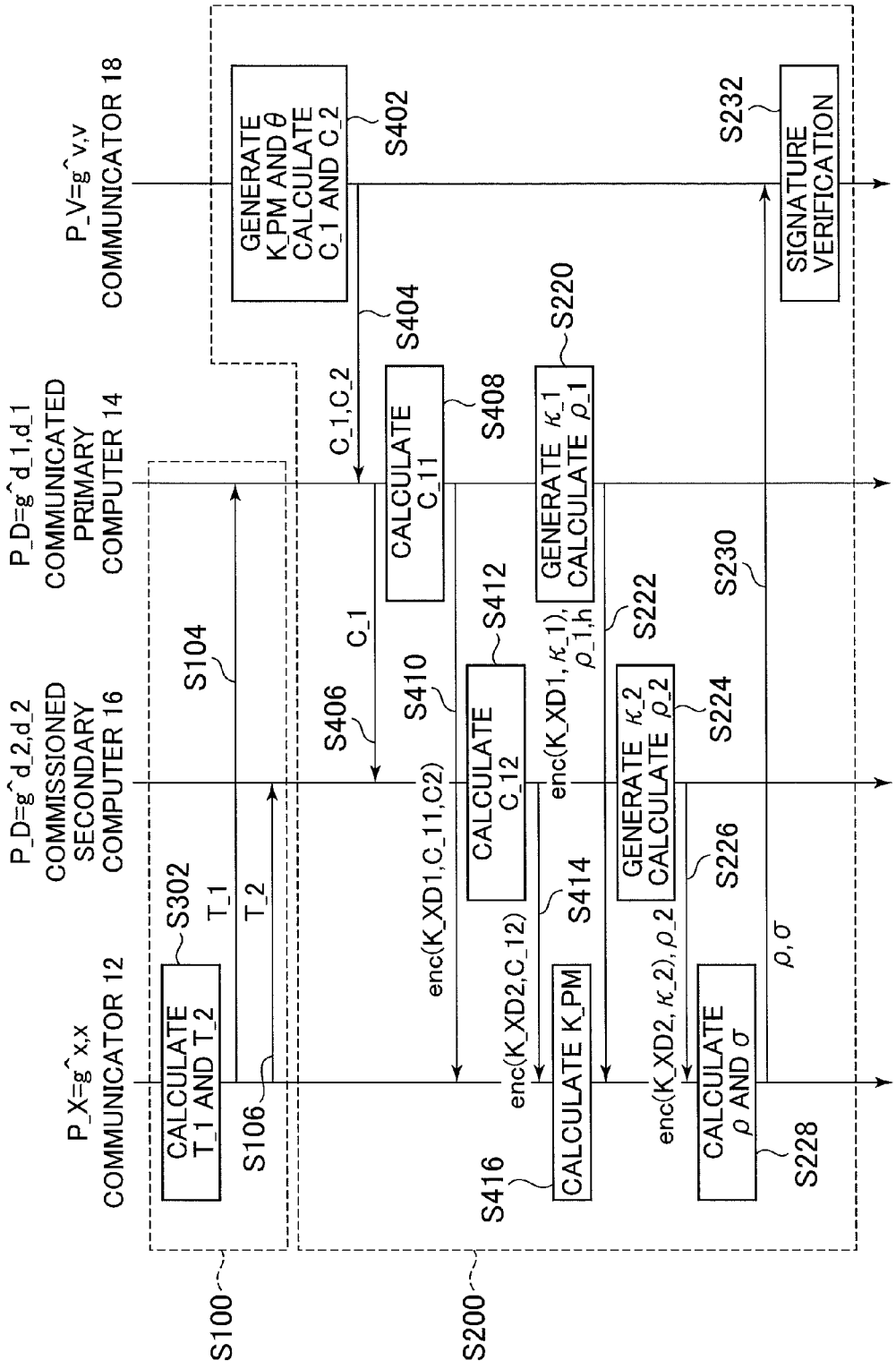
FIG. 16 shows a sequence of key sharing and authentication processes according to the alternative embodiment.

Next, operations of this embodiment will be described below. FIG. 16 is a sequence diagram illustrating the steps of the key sharing and authentication processes according to this embodiment.

The communicator 12 generates the partial commissioned parameter information T_1 to be supplied to the commissioned primary computer 14 and the partial commissioned parameter information T_2 to be supplied to the commissioned secondary computer 16. The communicator 12 then delivers the generated information T_1 and T_2 to the computers 14 and 16, respectively (step S100).

The method used here to generate the partial commissioned parameter information T_1 and T_2 is different from that in the previous embodiment. A method for generating the partial commissioned parameter information used in this embodiment will be described below.

First, in the communicator 12, the verifier 103 receives the public key certificate CERT_D1 for the commissioned primary computer 14, the public key certificate CERT_D2 for the commissioned secondary computer 16 on the transceiver 28.

The verifier 52 further acquires the public key P_D1 for the commissioned primary computer 14 and the public key P_D2 for the commissioned secondary computer 16 on the basis of the received certificates.

Then, the commissioned parameter generator 56 receives the public keys P_D1 and P_D2 from the verifier 52 and the secret key x from the secret key memory 46.

The commissioned parameter generator 56 derives the commissioned parameter information T_1 and T_2 according to Expressions 16 and 17, with the public keys P_D1 and P_D2 and the secret key x used (step S302).

The generated information T_1 and T_2 is delivered to the commissioned primary computer 14 and the commissioned secondary computer 16, respectively, and stored in the respective commissioned parameter memories, along with the operations performed by the previous embodiment.

Even in case of the previous embodiment, the commissioned parameter information T_1 and T_2 can be derived by the process of step S302. In that case, the commissioned parameter information decrypted with the key shared between the communicator 12 and the either commissioned computer can be indicated as X_j. The calculator 190 in the partial shared key calculator 168 derives P_V^rX_j on the public key P_V and the parameter r. The derived P_V^rX_j may be sent to the communicator 12, where ΠP_V^X_j=P_V^rx may be synthesized by the communicator 12.

Subsequently, key sharing and authentication processes of the system 10 in this embodiment will be described below. In the communicator 18, the premaster secret determiner 332 determines the premaster secret K_PM and supplies the determined K_PM to the premaster secret deliverer 334. The deliverer 334 determines the integer θ at random. Furthermore, the deliverer 334 encrypts the premaster secret K_PM by using Expression 21 to generate the ciphertext (C_1 and C_2) (step S402).

The deliverer 334 delivers ciphertext (C_1, C_2) to the commissioned primary computer 14. That is, the ciphertext including the ciphertext parameter information C_1 and C_2 is delivered to the commissioned primary computer 14 (step S404).

Upon receiving the ciphertext (C_1, C_2) from the communicator 18, the commissioned primary computer 14 routes the ciphertext parameter information C_1 to the commissioned secondary computer 16 (step S406).

At this time, in the commissioned primary computer 14, the ciphertext parameter information C_1 is supplied to the partial ciphertext calculator 276. The ciphertext parameter information C_2 is supplied to the temporary storage 272 and stored therein.

In the commissioned primary computer 14, the partial ciphertext calculator 276 derives the partial ciphertext parameter information C_11 by using Expression 20, on the basis of the ciphertext parameter information C_1 received from the communicator 18, the public key P_X for the communicator 12 read from the verifier 112, the commissioned parameter information T_1 read from the commissioned parameter memory 106 and the secret key d_1 read from the secret key memory 104 (step S408).

The partial ciphertext calculator 276 encrypts the partial ciphertext parameter information C_11 with the shared key K_XD1 read out from the secret key memory 104. The transceiver 102 delivers the encrypted information enc(K_XD1, C_11) and the ciphertext parameter information C_2 temporarily stored in the temporary storage 272 to the communicator 12 (step S410).

In the commissioned secondary computer 16, the partial ciphertext calculator 292 derives the partial ciphertext parameter information C_12 according to Expression 20 on the basis of the ciphertext parameter information C_1 received from the computer 14, the public key P_X read from the verifier 164, the commissioned parameter information T_2 read from the commissioned parameter memory 160 and the secret key d_2 read from the secret key memory 156 (step S412).

The partial ciphertext calculator 292 encrypts the partial ciphertext parameter information C_12 with the shared key K_XD2 read from the secret key memory 156. The transceiver 152 receives the encrypted information enc(K_XD2, C_12) to deliver it to the communicator 12 (step S414).

In the communicator 12, the ciphertext parameter decrypter 254 decrypts the encrypted information enc (K_XD1, C_11) and enc(K_XD2, C_12) by using the secret keys K_XD1 and K_XD2, respectively, stored in the secret key memory 46, thus obtaining the partial ciphertext parameter information C_11 and C_12.

The decrypter 254 supplies the decrypted partial ciphertext parameter information C_11 and C_12 to the premaster secret synthesizer 258. The synthesizer 258 derives premaster secret K_PM, on the basis of the information C_11 and C_12 and the parameter ciphertext parameter information C_2 received from the commissioned primary computer 14, according to Expression 18 (step S416). The derived information K_PM is stored in the secret key memory 46.

Subsequent operations, that is, steps 220-232 may be similar to those performed by the previous embodiment. Thus, their detail description is omitted.

Due to the constitution and operations described so far, this embodiment has the following advantages. The pieces of secret information used in calculating the ciphertext parameter information C_11 and C_12 in the commissioned primary computer 14 and the commissioned secondary computer 16 are only the secret key d_1 and d_2, respectively.

The results of calculations performed by the commissioned primary computer 14 and commissioned secondary computer 16 are received and then combined with each other into the shared key K by the communicator 12. Consequently, no commissioned computer can know the shared key K. Therefore, if one of the commissioned computers is taken over by a cyber attacker, the attacker cannot synthesize the shared key K as long as the other computer is secure.

Between the communicators 12 and 18, the key sharing by making use of delivery of a premaster secret and a key sharing protocol using authentication relying on digital signature technology can be carried out while the communicator 12 assigns some of calculations to the commissioned computers 14 and 16.

Computations required to be performed by the communicator 12 are only two computational operations. For example, the computational operations are a computation for decryption of the shared key and a multiplication operation on a finite field. Alternatively, the required operations are adding rational points on an elliptic curve.

Furthermore, information transmitted from the commissioned secondary computer 16 to the communicator 12 is once routed through the commissioned primary computer 14. As a result, the commissioned primary computer 14 can transmit the encrypted ciphertext parameter information enc (K_XD1, C_11) and enc(K_XD2, K_12), the encrypted partial signature parameter information enc(K_XD1, κ_1) and enc(K_XD2, κ_2), the partial signature parameters ρ_1 and ρ_2 and the message digest h as a whole. The communicator 12 delivers the signature parameter information ρ and σ to the commissioned primary computer 14 and thence to the communicator 18. Consequently, the communicator 12 can completely communicate with commissioned primary computer 14 by performing only one reciprocating communication.

As described so far, the embodiment of the present invention can provide a system satisfying the above-mentioned five conditions.

In the described embodiments, the communicator 18 authenticates the digital signature given from the communicator 12. Alternatively, the communicators 100 and 18 may provide mutual authentication. If the mutual authentication is performed, a digital signature generated by the communicator 18 may be verified by the commissioned primary computer 14 in proxy of the communicator 12.

In the above-described embodiment, ElGamal cryptography or elliptic curve ElGamal cryptography is assumed as the cryptographic algorithm. However, an RSA (Rivest-Shamir-Adleman) cryptographic algorithm can be also applied to the system 10 of the above embodiment. More specifically, in RSA cryptography, if the number of synthesized numbers is L and n=φ(L), where φ(·) is an Euler's function, and if the public key for the communicator 12 relative to the secret key x for the communicator 12 is y, then there is an integer satisfying the relation, xy≡1(mod n).

Figure 17:
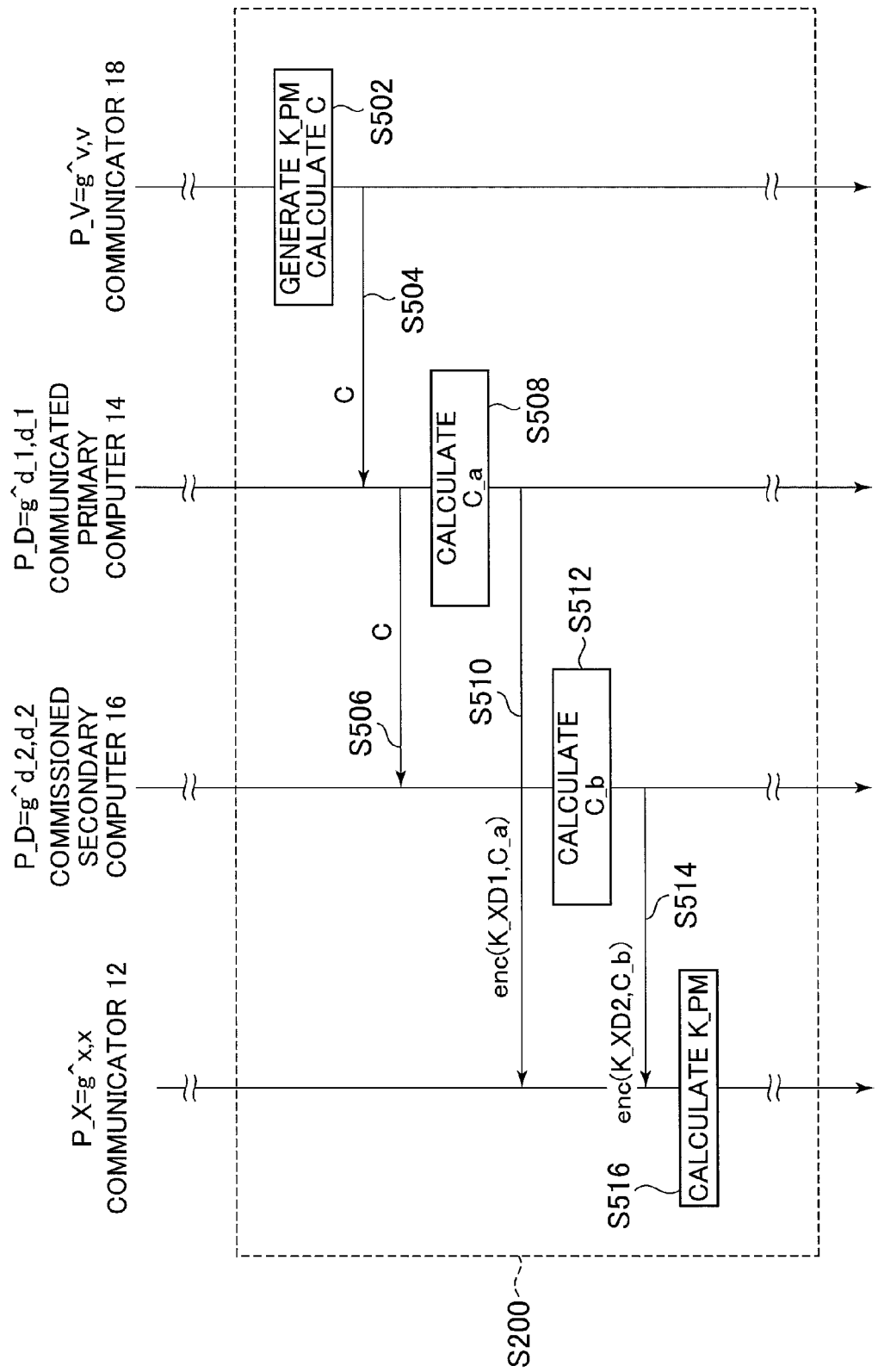
FIG. 17 shows another sequence of key sharing and authentication processes.

Calculating operations of the premaster secret by use of the RSA cryptographic algorithm will be described below with reference to FIG. 17. The preparatory process is similar to that shown in step S100 performed by the above embodiment. Thus, the detailed illustration of the process is omitted.

In the communicator 18, the premaster secret determiner 332 determines the premaster secret K_PM. The premaster secret deliverer 334 further computes the ciphertext C by using C=K_PM^χ (step S502).

The communicator 18 delivers the computed ciphertext C to the primary computer 14 (step S504). The computer 14 further routes the ciphertext C to the commissioned secondary computer 16 (step S506).

The commissioned primary computer 14 further feeds the ciphertext C to the partial ciphertext calculator 276. In this way, the primary computer 14 need not include the temporary storage 272. The partial ciphertext calculator 276 performs computations similar to those performed in step S202 to derive output information C_a (step S508).

The partial ciphertext calculator 276 encrypts the output information C_a with the shared key K_XD1 to the transceiver 102, which delivers the encrypted information enc(K_XD1, C_a) to the communicator 12 (step S510).

In the commissioned secondary computer 16, the partial ciphertext calculator 292 performs computations similar to those performed in step S412 to derive output information C_b (step S512). The partial ciphertext calculator 292 encrypts the information C_b with the shared key K_XD2 to the transceiver 152, which delivers the encrypted information enc(K_XD2, C_b) to the communicator 12 (step S514).

In the communicator 12, the ciphertext parameter decrypter 254 decrypts the encrypted the delivered information C_a and C_b and then outputs the decrypted information to the premaster secret synthesizer 258. In this synthesizer 258, premaster secret K_PM is derived by following Expression 24. Thus, it is possible to cope with the RSA cryptographic algorithm (step S516).

$$K\_PM = C\_a \cdot C\_b \pmod{n} \tag{24}$$

As stated above, the commissioned primary computer 16 in this embodiment can be also considered as the invention relating to a commissioned computer including a partial ciphertext calculator for managing information on a ciphertext, a message digest generator for generating a message digest on the basis of a given massage and a transceiver for transmitting the information on the ciphertext to another commissioned computer and a proxy communicator and the message digest to the proxy communicator.

Figure 18:
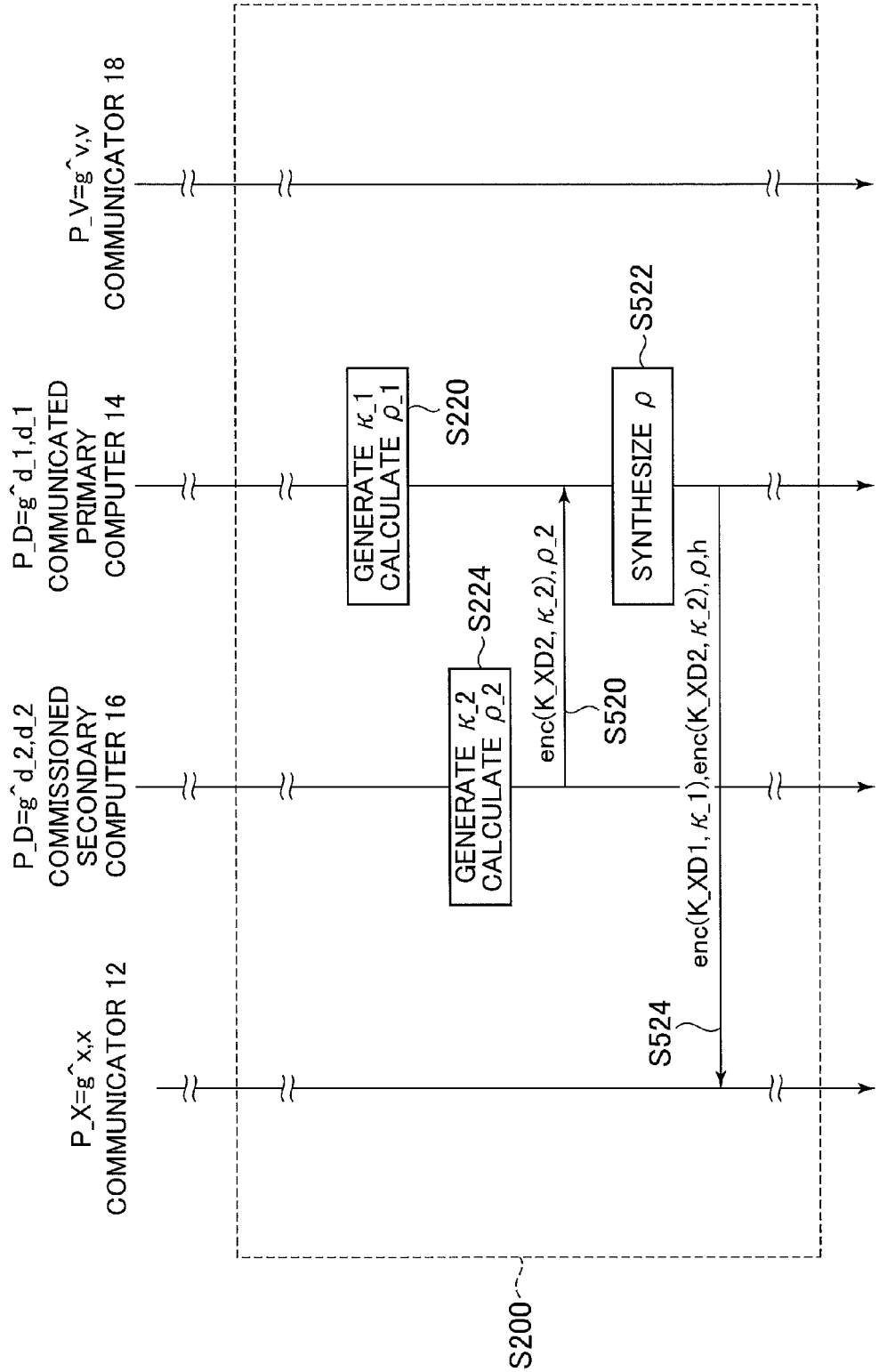
FIG. 18 shows still another sequence of key sharing and authentication processes.

Regarding a signature generation process, in the above embodiments, the commissioned primary computer 14 generates parameters κ_1 and ρ_1 and delivers them to the communicator 12. Similarly, the commissioned secondary computer 16 generates parameters κ_2 and ρ_2 and delivers them to the communicator 12. However, in these embodiments, parameter ρ_2 is supplied to the communicator 12 without being encrypted. Accordingly, as shown in FIG. 18, the commissioned secondary computer 16 may deliver encrypted parameter enc(K_XD2, κ_2) and parameter ρ_2 to the commissioned primary computer 14 (step S520). The commissioned primary computer 14 may produce the produced digital signature parameter ρ according to following Expression 25 (step S522). The produced parameter ρ can be delivered from the primary computer 14 to the communicator 12 with the encrypted parameters and the message digest h (step S524).

$$\rho = \rho\_1 \cdot \rho\_2 \tag{25}$$

A communicator, which has a transceiver, including either one or more of the communication information generator, the shared key calculator and the signature synthesizer in accordance with the invention can be also considered as the invention described above. Similarly, a commissioned computer including either one or more of the commissioned key sharing computer and commissioned signature generator in accordance with the invention can be also considered as the invention described above.

Furthermore, a communication system including the communicator and/or the commissioned computer in accordance with the invention described above can be also considered within the scope of the invention.

The entire disclosure of Japanese patent application No. 2012-015216 filed on Jan. 27, 2012, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A commission information generator configured to generate encrypted commission parameters, comprising:
   a first memory configured to store a given integer x, an integer number N of symmetric keys (key_1, key_2, . . . , key_N), and a public key P included in a given cyclic group <G,*>of an order indicated by a term n;
   a decomposer configured to decompose the integer x stored in the first memory into N decomposed integers (x_1, x_2, . . . , x_N) included in an additive group (<Z_n,+>) of integers; and
   a commission parameter generator configured to generate N encrypted commission parameters (P^(x_1), P^(x_2), . . . , P^(x_N)),
   wherein the decomposer reads out the given integer x from the first memory and decomposes it into the decomposed N integers included in the additive group ($<Z\_n,+>$) using the equality $x=x\_1+x\_2+\ldots+x\_N(\mod n)$, and outputs the N decomposed integers to the commission parameter generator, wherein the commission parameter generator picks a decomposed integer x_i (where i is a positive integer equal to or less than N) from the N decomposed integers output from the decomposer, and reads out the public key P from the first memory, performs a calculation using an operation (*) on the given cyclic group $<G,*>$ as an operator and the public key P as respective operands, and wherein the commission parameter generator further respectively encrypts the calculated commission parameter ($P^{\wedge}(x\_i)$) using the symmetric key (key_i) corresponding to respective parameters.

2. The commission information generator in accordance with claim 1, wherein the N decomposed integers include N secret key units, from a first secret key unit to an N-th secret key unit.

3. The commission information generator in accordance with claim 1, further comprising:
- a second memory configured to store further public keys, from a second public key to an N+1-th public key;
- a calculator configured to perform a calculation with the given integer and the respective public keys read out from the second memory as an element of the given cyclic group; and
- a key converter configured to convert the calculation result performed by the calculator into the N symmetric keys.

\* \* \* \* \*